(12) United States Patent
Park et al.

(10) Patent No.: US 11,645,919 B2
(45) Date of Patent: May 9, 2023

(54) IN-VEHICLE VEHICLE CONTROL DEVICE AND VEHICLE CONTROL METHOD

(71) Applicant: LG Electronics Inc., Seoul (KR)

(72) Inventors: Suho Park, Seoul (KR); Hansung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 330 days.

(21) Appl. No.: 16/763,734

(22) PCT Filed: Nov. 22, 2017

(86) PCT No.: PCT/KR2017/013338
§ 371 (c)(1),
(2) Date: May 13, 2020

(87) PCT Pub. No.: WO2019/098434
PCT Pub. Date: May 23, 2019

(65) Prior Publication Data
US 2020/0349850 A1    Nov. 5, 2020

(30) Foreign Application Priority Data
Nov. 17, 2017  (KR) .................... 10-2017-0154109

(51) Int. Cl.
*G08G 1/00* (2006.01)
*H04W 4/46* (2018.01)
*B60W 30/165* (2020.01)

(52) U.S. Cl.
CPC .......... *G08G 1/22* (2013.01); *B60W 30/165* (2013.01); *H04W 4/46* (2018.02)

(58) Field of Classification Search
CPC ......... B60W 30/165; G08G 1/22; H04W 4/46
See application file for complete search history.

(56) References Cited

U.S. PATENT DOCUMENTS

2009/0048768 A1    2/2009  Taguchi
2010/0021011 A1    1/2010  Shida
(Continued)

FOREIGN PATENT DOCUMENTS

JP    2015108860    6/2015
KR    20110064861   6/2011
(Continued)

OTHER PUBLICATIONS

Extended European Search Report in European Appln. No. 17932516.2, dated Jul. 21, 2021, 10 pages.
(Continued)

*Primary Examiner* — Ajay Cattungal
(74) *Attorney, Agent, or Firm* — Fish & Richardson P.C.

(57) ABSTRACT

The present disclosure relates to a vehicle control device mounted on a vehicle and a method for controlling the vehicle. A vehicle control device according to the present disclosure is a vehicle control device that controls a vehicle platooning with at least one other vehicle, the vehicle control device including: a communication portion communicating with the at least one other vehicle; and a control portion calculating a sensing range allocated to each of the at least one other vehicle in the platooning based on an arrangement pattern of the platooning.

11 Claims, 18 Drawing Sheets

(56) References Cited

U.S. PATENT DOCUMENTS

| | | | | |
|---|---|---|---|---|
| 2014/0005906 | A1* | 1/2014 | Pandita | B60W 30/17 |
| | | | | 706/46 |
| 2016/0358477 | A1* | 12/2016 | Ansari | B60W 30/12 |
| 2016/0366598 | A1* | 12/2016 | Gallagher | H04W 52/367 |
| 2017/0011633 | A1* | 1/2017 | Boegel | G08G 1/22 |
| 2018/0224846 | A1* | 8/2018 | Kovacs | G08G 1/096783 |
| 2019/0174286 | A1* | 6/2019 | Guo | H04W 4/80 |
| 2019/0387558 | A1* | 12/2019 | Cao | H04W 12/033 |
| 2020/0349850 | A1* | 11/2020 | Park | G08G 1/22 |

FOREIGN PATENT DOCUMENTS

| | | |
|---|---|---|
| KR | 1020150076757 | 7/2015 |
| KR | 20150101204 | 9/2015 |
| KR | 1020170089121 | 8/2017 |
| KR | 1020170101874 | 9/2017 |

OTHER PUBLICATIONS

Notice of Allowance in Korean Appln. No. 10-2017-0154109, dated Aug. 12, 2019, 9 pages (with English translation).

Zhang & Melujerdi, "A Survey on Multiple Unmanned Vehicles Formation Control and Coordination: Normal and Fault Situations," 2013 International conference on unmanned aircraft systems (ICUAS), May 2013, 1087-1096.

* cited by examiner

IN-VEHICLE VEHICLE CONTROL DEVICE AND VEHICLE CONTROL METHOD

This application is a National Stage application under 35 U.S.C. § 371 of International Application No. PCT/KR2017/013338, filed on Nov. 22, 2017, which claims the benefit of Korean Patent Application No. 10-2017-0154109, filed on Nov. 17, 2017. The disclosures of the prior applications are incorporated by reference in their entirety.

TECHNICAL FIELD

The present disclosure relates to a vehicle control device mounted on a vehicle and a method for controlling the vehicle.

BACKGROUND ART

A vehicle is an apparatus that a user who gets therein can move in desired directions. Representatively, a car can be exemplified.

Meanwhile, for the convenience of users who use vehicles, it is a tendency to provide various sensors and electronic devices. In particular, an Advanced Driver Assistance System (ADAS) is actively studied for the convenience of driving of users. Further, autonomous vehicles are actively developed.

As described above, as the Advanced Driver Assistance System (ADAS) is actively developed, there is a need for developing a technology that can maximize convenience and safety for users in driving of vehicles.

For smooth autonomous driving, a vehicle can communicate with all devices that can perform communication (e.g., a mobile terminal, a server, another vehicle, and a road infrastructure). This may be referred to a Vehicle to everything (V2X) communication. V2X communication may be generally defined as a technology that exchanges or shares information such as a traffic condition while communicating with a road infrastructure and another vehicle in driving.

Vehicle to Vehicle (V2V) communication may be understood as an example of V2X communication or may be understood as a concept included in V2X communication. That is, a vehicle can communicate with surrounding vehicles (or other vehicles), which may be referred to as V2V communication. V2V communication may be generally defined as a technology that enables vehicles to exchange information, and can share the position and speed information, etc. of surrounding vehicles.

Based on these communication technologies, a vehicle can receive a great number of data for controlling the vehicle. For example, it is possible to receive V2X data from another vehicle, a terminal of a pedestrian, and an infrastructure such as a traffic light that are positioned within a predetermined range from a vehicle. Further, since 5G Networks will be constructed in the future, more information could be transmitted fast.

Through this V2V service, a platooning technology in which following vehicles move along with a leader vehicle by receiving driving information of the leader vehicle is actively developed.

However, when following vehicles at the rear have difficulty in receiving the driving information of a leader vehicle at the front in platooning, the formation of the platooning or the leader vehicle should be changed.

Further, there is a problem that a leader vehicle exchanges data with several following vehicles through V2V communication and senses surrounding data for platooning, so the leader vehicle uses many communication resources.

DISCLOSURE

Technical Problem

An object of the present disclosure is to solve the problems described above and other problems. Another object is to provide a vehicle control device that can allocate a sensing range for each following vehicle in consideration of an arrangement pattern of platooning, a method for controlling the vehicle.

Technical Solution

According to an aspect of the present disclosure for achieving the above or other objects, there is provided a vehicle control device that controls a vehicle platooning with at least one other vehicle, the vehicle control device including: a communication portion communicating with the at least one other vehicle; and a control portion calculating a sensing range allocated to each of the at least one other vehicle in the platooning based on an arrangement pattern of the platooning.

In an embodiment, the communication portion may receive data sensed for each sensing range from the at least one other vehicle.

Accordingly, the control portion may generate a control signal for controlling the platooning based on the data sensed for each sensing range.

In another embodiment, the vehicle may be positioned in an area having a smallest range of the sensing range in the platooning.

In another embodiment, the control portion may set a position of the at least one other vehicle in the platooning in consideration of sensing performance for each of the at least one other vehicle.

In another embodiment, the control portion may calculate the sensing range allocated to each of the at least one other vehicle in the platooning in consideration of sensing performance for each of the at least one other vehicle.

In another embodiment, the control portion may calculate the sensing range allocated to each of other vehicles pertaining to a reconstructed platooning group when a vehicle comes out of the platooning group or a new vehicle comes into the platooning group.

In another embodiment, the control portion may recalculate a sensing range allocated to each of the at least one other vehicle in the platooning when the arrangement pattern of the platooning is changed.

In this case, the control portion may generate a control signal for positioning the vehicle in an area having a smallest sensing range in the platooning.

In another embodiment, when the platooning group is divided into a plurality of groups, the control portion may calculate the sensing range allocated to each of other vehicles pertaining to a same group as the vehicle's group of the plurality of groups.

In another embodiment, the vehicle may be poor in sensing performance than at least one other vehicle pertaining to the platooning group.

In another embodiment, the control portion may calculate the sensing range allocated to each of the at least one other vehicle in the platooning in consideration of a driving direction of the platooning group.

In another embodiment, the control portion may set the sensing range allocated to each of the at least other vehicle such that the sensing ranges do not overlap each other in the platooning.

In another embodiment, the control portion may set a predetermined area such that the area is included in a duplicate manner in a sensing range allocated to each of the at least other vehicle.

In this case, the predetermined area may be an accident occurrence region, a traffic jam area, and a crossroad area.

Further, according to another aspect, a method for controlling a vehicle that performs platooning with at least one other vehicle, the method comprising: communicating with the least one other vehicle; and calculating a sensing range allocated to each of the at least one other vehicle in the platooning based on an arrangement pattern of the platooning.

In an embodiment, the method may further include receiving data sensed for each sensing range from the at least one other vehicle.

In another embodiment, the method may further include generating a control signal for controlling the platooning based on the data sensed for each sensing range.

Advantageous Effects

The effects the vehicle control device mounted on a vehicle and a method for controlling the vehicle according to the present disclosure are as follows.

According to at least one of embodiments of the present disclosure, by allocating sensing ranges respectively to other vehicles forming platooning, there is no need for sensing the entire area. Accordingly, each of the following vehicles mainly senses a specific area, thereby being able to save communication resources.

Further, it is possible to select a vehicle having the most communication resources in reserve due to a small sensing range as a leader vehicle. As a result, the leader vehicle can transmit control information for platooning with a message using the saved resources.

That is, by allocating and sharing a sensing arrange for each vehicle, the communication resources of each vehicle can be saved and the data exchange speed can be improved.

Applicability and an additional range of the present disclosure will be made clear from the following detailed description. However, various changes and modification within the spirit and scope of the present disclosure can be clearly understood by those skilled in the art, so the detailed description and specific embodiments such as preferred embodiments of the present disclosure should be understood only as examples.

MODE FOR INVENTION

Figure 1:
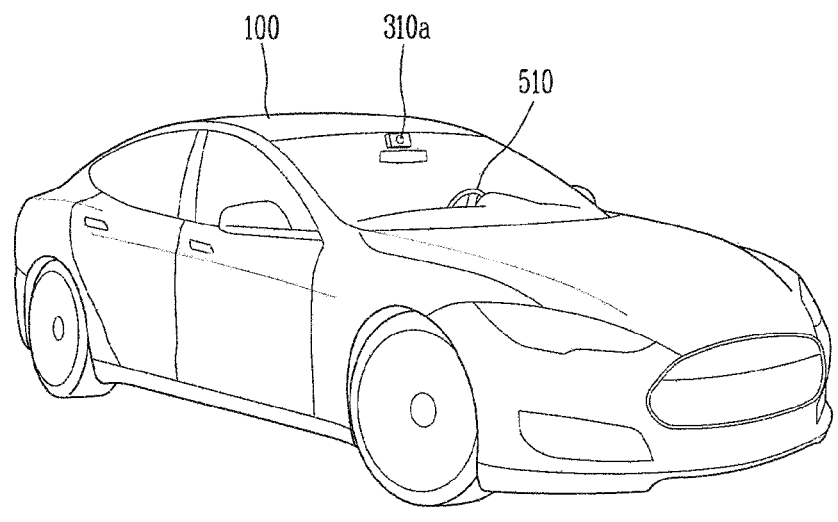
FIG. 1 is a view showing the external appearance of a vehicle according to an embodiment of the present disclosure.
Figure 1:
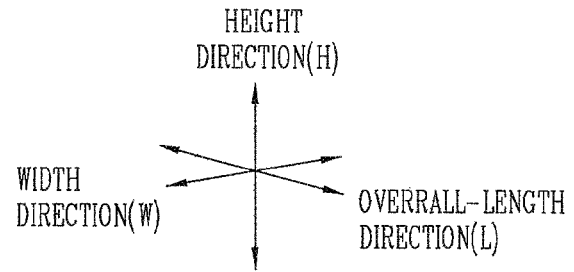

Hereafter, embodiments of the present disclosure will be described in detail with reference to the accompanying drawings and the same or similar components are given the same reference numerals regardless of the numbers of figures and are not repeatedly described. Terms "module" and "unit" that are used for components in the following description are used only for the convenience of description without having discriminate meanings or functions. In the following description, if it is decided that the detailed description of known technologies related to the present disclosure makes the subject matter of the embodiments described herein unclear, the detailed description is omitted. Further, the accompanying drawings are provided only for easy understanding of embodiments disclosed in the specification, the technical spirit disclosed in the specification is not limited by the accompanying drawings, and all changes, equivalents, and replacements should be understood as being included in the spirit and scope of the present disclosure.

Terms including ordinal numbers such as first, second, etc., may be used to describe various components, but the components are not to be construed as being limited to the terms. The terms are used only to distinguish one component from another component.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

Singular forms are intended to include plural forms unless the context clearly indicates otherwise.

It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

A vehicle described in the specification may be a concept including a car and a motor cycle. A car is exemplified as the vehicle in the following description.

The vehicle described in the specification may be a concept including all of an internal combustion engine vehicle having an engine as a power source, a hybrid vehicle having an engine and an electric motor as power sources, an electric vehicle having an electric motor as a power source, etc.

In the following description, the term "left" of a vehicle means the left side in the driving direction of the vehicle and the term "right" of a vehicle means the right side in the driving direction of the vehicle.

FIG. 1 is a view showing the external appearance of a vehicle according to an embodiment of the present disclosure.

Figure 2:
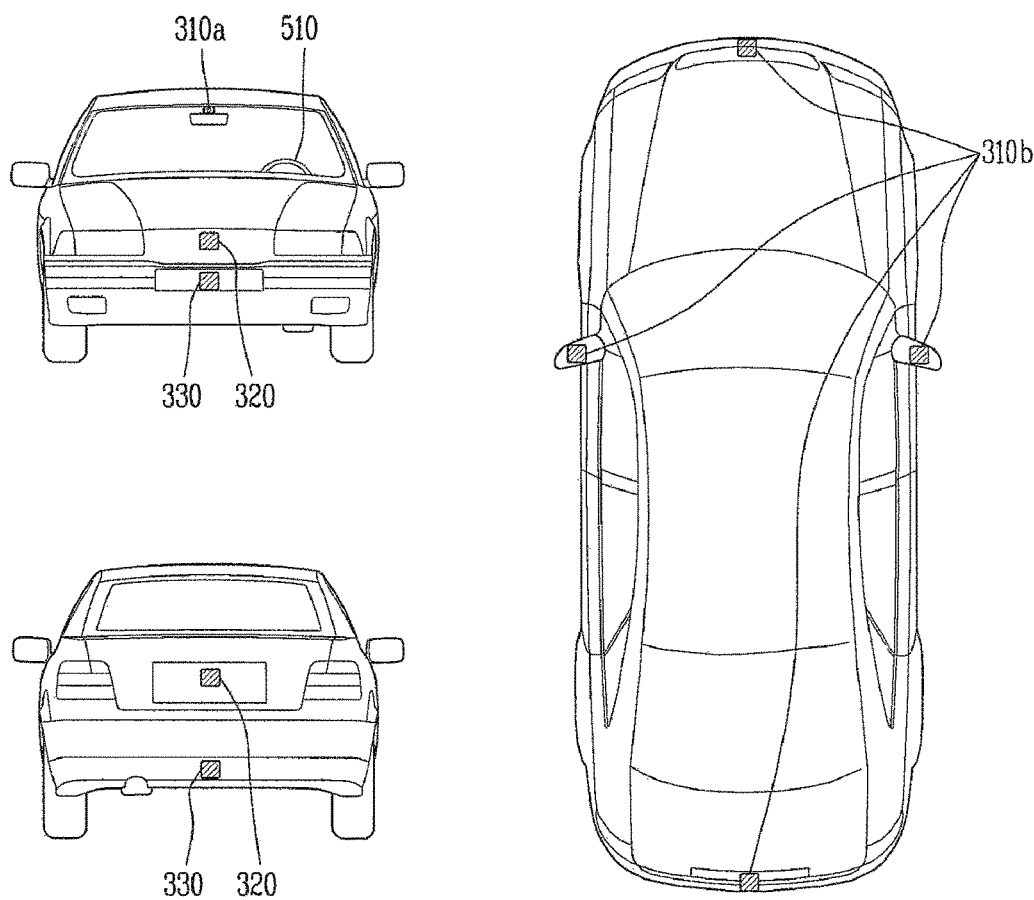
FIG. 2 is a view showing the vehicle according to an embodiment of the present disclosure at various angles from the outside.

FIG. 2 is a view showing the vehicle according to an embodiment of the present disclosure at various angles from the outside.

Figure 3:
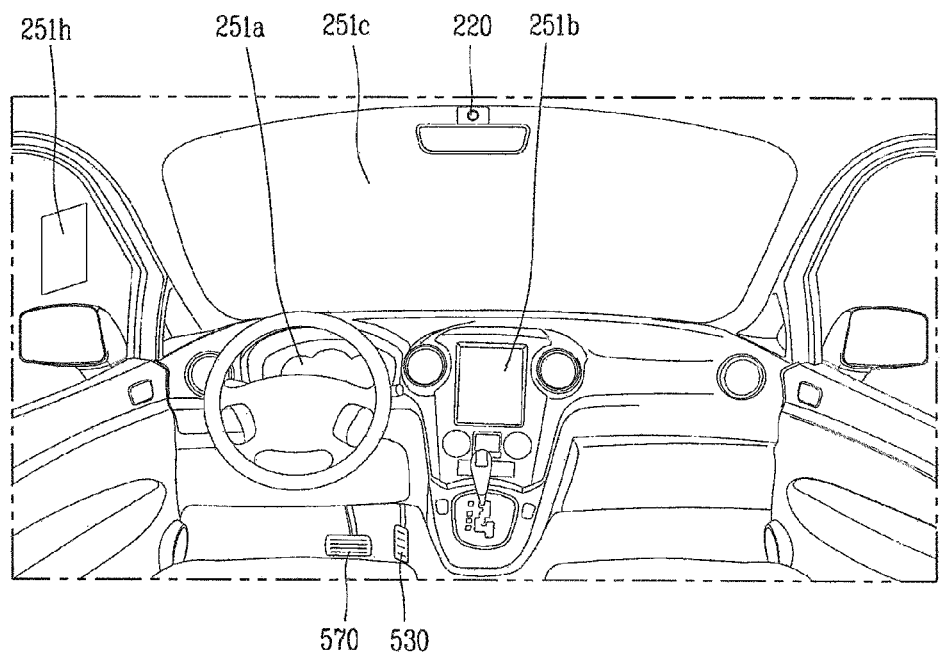
FIGS. 3 and 4 are views showing the interior of the vehicle according to an embodiment of the present disclosure.
Figure 4:
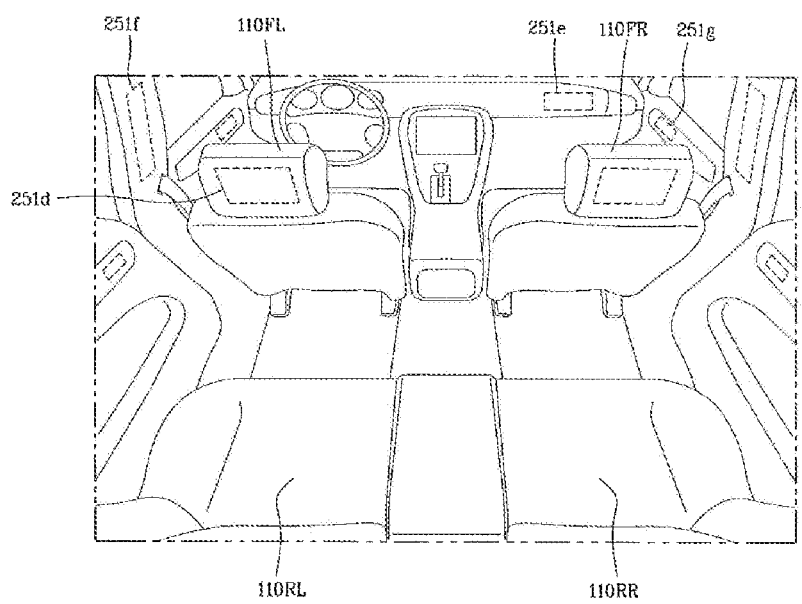

FIGS. 3 and 4 are views showing the interior of the vehicle according to an embodiment of the present disclosure.

Figure 5:
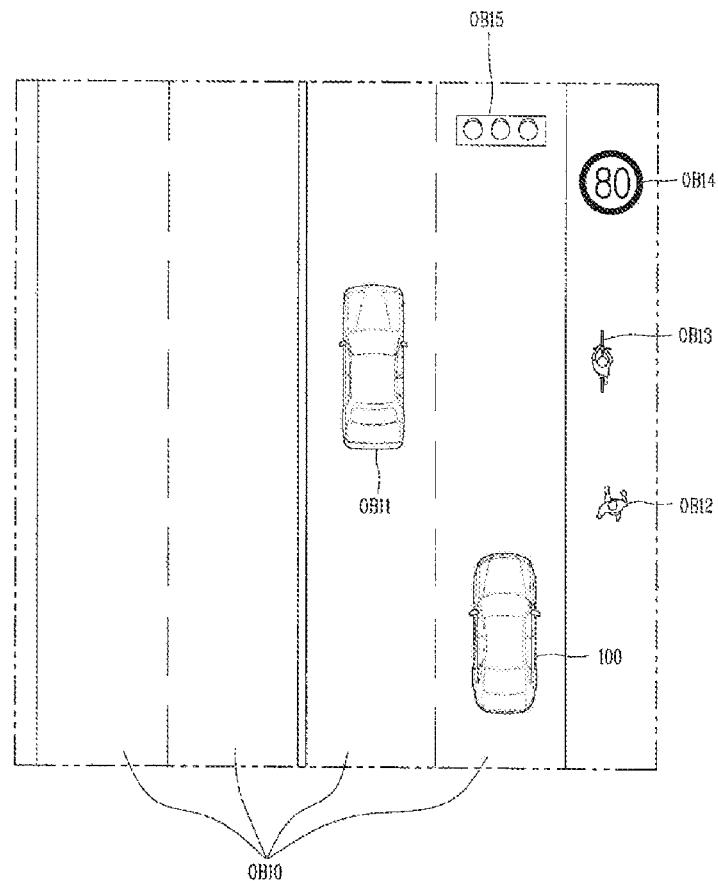
FIGS. 5 and 6 are views that are referred to in description of objects according to an embodiment of the present disclosure.
Figure 6:
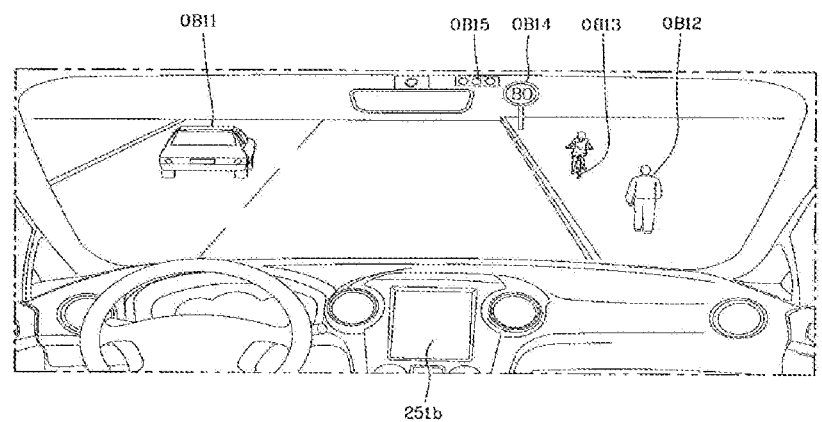

FIGS. 5 and 6 are views that are referred to in description of objects according to an embodiment of the present disclosure.

Figure 7:
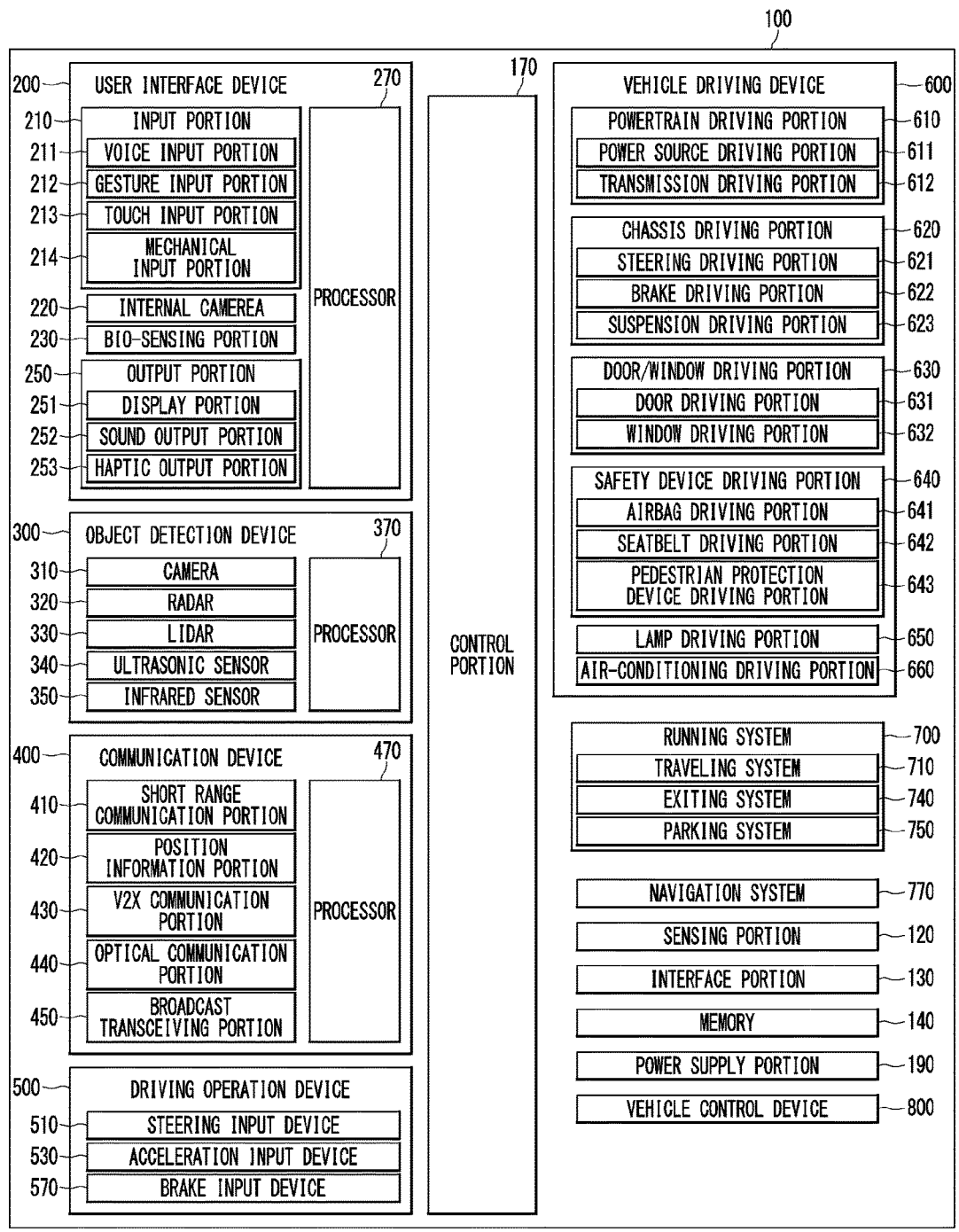
FIG. 7 is a block diagram that is referred to in description of a vehicle according to an embodiment of the present disclosure.

FIG. 7 is a block diagram that is referred to in description of a vehicle according to an embodiment of the present disclosure.

Referring to FIGS. 1 to 7, a vehicle 100 may include wheels that are rotated by a power source and a steering input device 510 for adjusting the driving direction of the vehicle 100.

The vehicle 100 may be an autonomous vehicle.

The vehicle 100 may be changed into an autonomous mode or a manual mode based on input from a user.

For example, the vehicle may be changed from the manual mode from the autonomous mode or may be changed from the autonomous mode to the manual mode based on input from a user that is received through a user interface device 200.

The vehicle 100 may be changed into the autonomous mode or the manual mode based on driving situation information. The driving situation information may be generated based on object information provided from an object detection device 300.

For example, the vehicle may be changed from the manual mode from the autonomous mode or may be changed from the autonomous mode to the manual mode based on the driving situation information generated by the object detection device 300.

For example, the vehicle may be changed from the manual mode from the autonomous mode or may be changed from the autonomous mode to the manual mode based on the driving situation information received through a communication device 400.

The vehicle 100 may be chanted from the manual mode into the autonomous mode or may be changed from the autonomous mode into the manual mode based on information, data, and signals provided from an external device.

When the vehicle 100 is driven in the autonomous mode, the autonomous vehicle 100 may be driven based on a running system 700.

For example, the autonomous vehicle 100 may be driven based on information, data, or a signal generated by a running system 710, an exiting system 740, and a parking system 750.

When the vehicle 100 is driven in the manual mode, the autonomous vehicle 100 may receive user input for driving through a driving operation device 500. The vehicle 100 may be driven based on user input received through the driving operation device 500.

An overall length means the length from the front to the rear of the vehicle 100, a width means the width of the vehicle 100, and a height means the length from the bottom of a wheel to the roof. In the following description, an overall-length direction L may mean a direction that is the reference of overall length measurement of the vehicle, a width direction W may mean a direction that is the reference of width measurement of the vehicle 100, and a height direction H may mean a direction that is the reference of height measurement of the vehicle 100.

As exemplified in FIG. 7, the vehicle 100 may include a user interface device 200, an object detection device 300, a communication device 400, a driving operation device 500, a vehicle driving device 600, a running system 700, a navigation system 770, a sensing portion 120, an interface portion 130, a memory 140, a control portion 170, and a power supply portion 190.

Depending on embodiments, the vehicle 100 may further include components other than the components described in the specification or may not include some of the described components.

The user interface device 200 is a device for communication between the vehicle 100 and a user. The user interface device 200 can receive user input and provide information generated in the vehicle 100 to the user. The vehicle 100 can realize a user interface (UI) or user experience (UX) through the user interface device 200.

The user interface device 200 may include an input portion 210, an internal camera 220, a bio-sensing portion 230, an output portion 250, and a processor 270.

Depending on embodiments, the user interface device 200 may further include components other than the components described in the specification or may not include some of the described components.

The input portion 210 is for receiving information input from a user, and data collected through the input portion 210 can be analyzed by the processor 270 and processed by a control instruction by the user.

The input portion 210 may be disposed in the vehicle. For example, the input portion 210 may be disposed in an area of a steering wheel, an area of an instrument panel, an area of a seat, an area of each pillar, an area of a door, an area of a center console, an area of a head lining, an area of a sun visor, an area of a windshield, or an area of a window.

The input portion 210 may include a voice input portion 211, a gesture input portion 212, a touch input portion 213, and a mechanical input portion 214.

The voice input portion 211 can convert voice input of the user into an electrical signal. The converted electrical signal can be provided to the processor 270 or the control portion 170.

The voice input portion 211 may include one or more microphones.

The gesture input portion 212 can convert gesture input of the user into an electrical signal. The converted electrical signal can be provided to the processor 270 or the control portion 170.

The gesture input portion 212 may include at least any one of an infrared sensor and an image sensor for sensing gesture input of a user.

Depending on embodiments, the gesture input portion 212 can sense 3D gesture input of a user. To this end, the gesture input portion may include a light emission portion that outputs a plurality of infrared beams of light, or a plurality of image sensors.

The gesture input portion 212 can sense 3D gesture input of a user through a Time of Flight (TOF) manner, a structured light manner, or a disparity manner.

The touch input portion 213 can convert touch input of a user into an electrical signal. The converted electrical signal can be provided to the processor 270 or the control portion 170.

The touch input portion 213 may include a touch sensor for sensing touch input of a user.

Depending on embodiments, the touch input portion 213 may be integrated with a display portion 251, thereby being able to implement a touch screen. Such a touch screen can provide an input interface and an output interface between the vehicle 100 and a user.

The mechanical input portion 214 may include at least one of a button, a dome switch, a jog wheel, and a jog switch. An electrical signal generated by the mechanical input portion 214 can be provided to the processor 270 or the control portion 170.

The mechanical input portion 214 may be disposed on a steering wheel, a center fascia, a center console, a cockpit module, a door, etc.

The internal camera 220 can acquire an internal image of the vehicle. The processor 270 can sense the state of a user based on the internal image of the vehicle. The processor 270 can acquire gaze information of a user from the internal image of the vehicle. The processor 270 can sense a gesture of a user from the internal image of the vehicle.

The bio-sensing portion 230 can acquire biological information of a user. The bio-sensing portion 230 includes a sensor that can acquire biological information of a user, and can acquire fingerprint information, heartbeat information, etc. of a user, using the sensor. The biological information can be used for user authentication.

The output portion 250 is for generating output related to the sense of sight, the sense of hearing, the sense of touch, or the like.

The output portion 250 may include at least any one of a display portion 251, a sound output portion 252, and a haptic output portion 253.

The display portion 251 can display graphic objects corresponding to various items of information.

The display portion 251 may include at least one of a liquid crystal display (LCD), a thin film transistor liquid crystal display (TFT LCD), an organic light emitting diode (OLED), a flexible display, a 3D display, and an e-ink display.

The display portion 251 forms a mutual layer structure with the touch input portion 213 or is integrally formed with the touch input portion 213, thereby being able to implement a touch screen.

The display portion 251 may be implemented as a Head Up Display (HUD). When the display portion 251 is implemented as an HUD, the display portion 251 may include a projection module, thereby being able to output information through an image that is projected to a windshield or a window.

The display portion 251 may include a transparent display. The transparent display may be attached to a windshield or a window.

The transparent display may have predetermined transparency and display predetermined images. The transparent display, in order to have transparency, may include at least one of a Thin Film Electroluminescent (TFEL), a transparent Organic Light-Emitting Diode (OLED), a transparent Liquid Crystal Display (LCD), a transmissive transparent display, and a transparent Light Emitting Diode (LED) display. The transparency of the transparent display can be adjusted.

Meanwhile, the user interface device 200 may include a plurality of display portions 251*a* to 251*g*.

The display portion 251 may be disposed in an area of a steering wheel, an area 521*a*, 251*b*, 251*e* of an instrument panel, an area 251*d* of a seat, an area 251*f* of each pillar, an area 251*g* of a door, an area of a center console, an area of a head lining, and an area of a sun visor, or may be implemented in an area 251*c* of a windshield and an area 251*h* of a window.

The sound output portion 252 converts and outputs an electrical signal provided from the processor 270 or the control portion 170 into an audio signal. To this end, the sound output portion 252 may include one or more speakers.

The haptic output portion 253 generates tactual output. For example, the haptic output portion 253 can be operated such that a user can recognize output by vibrating a steering wheel, a safety belt, and seats 110FL, 110FR, 110RL, and 110RR.

The processor 270 can control the general operation of each unit of the user interface device 200.

Depending on embodiments, the user interface device 200 may include a plurality of processors 270 or may not include the processor 270.

When the processor 270 is not included in the user interface device 200, the user interface device 200 can be operated in accordance with control of a processor of another device in the vehicle 100 or the control portion 170.

Meanwhile, the user interface device 200 may be referred to as a display device for a vehicle.

The user interface device 200 can be operated in accordance with control of the control portion 170.

The object detection device 300 is a device for detecting objects positioned outside the vehicle 100.

The objects may be various objects related to driving of the vehicle 100.

Referring to FIGS. 5 to 6, an object 0 may include a lane OB10, another vehicle OB11, a pedestrian OB12, a two-wheeled vehicle OB13, traffic signals OB14 and OB15, light, a road, a structure, a bump, a landmark, an animal, etc.

The lane OB10 may be a driving lane, a lane next to a driving lane, and a lane in which an opposite vehicle is driven. The lane OB10 may be a concept including left and right lines forming a lane.

Another vehicle OB11 may be a vehicle that is being driven around the vehicle 100. Another vehicle may be a vehicle positioned within a predetermined distance from the vehicle 100. For example, another vehicle OB11 may be a vehicle that is driven ahead of or behind the vehicle 100.

The pedestrian OB12 may be a person positioned around the vehicle 100. The pedestrian OB12 may be a portion positioned within a predetermined distance from the vehicle 100. For example, the pedestrian OB12 may be a person positioned on a sidewalk or a roadway.

The two-wheeled vehicle OB13 may mean a vehicle that is positioned around the vehicle and is moved using two wheels. The two-wheeled vehicle OB13 may be a vehicle positioned within a predetermined distance from the vehicle 100 and having two wheels. For example, the two-wheeled vehicle OB13 may be a motorcycle or a bicycle positioned on a sidewalk or a roadway.

The traffic signal may include a traffic light OB15, a traffic sign OB14, a symbol or a text drawn on a road surface.

The light may be light generated from lamps of another vehicle, light generated from a street lamp, or the sunlight.

The road may include a road surface, a curve, and a slope such as an uphill and a downhill.

The structure may be an object positioned around a road and fixed to the ground. For example, the structure may include a street lamp, a street tree, a building, a utility pole, a traffic light, and a bridge.

The landmark may include a mountain, a hill, etc.

Meanwhile, the object may be classified into a moving object and a fixed object. For example, the moving object may be a concept including another vehicle and a pedestrian. For example, the fixed object may be a concept including a traffic light, a road, and a structure.

The object detection device 300 may include a camera 310, a radar 320, a lidar 330, an ultrasonic sensor 340, an infrared sensor 350, and a processor 370.

Depending on embodiments, the object detection device 300 may further include components other than the components described in the specification or may not include some of the described components.

The camera 310 may be disposed at an appropriate position outside the vehicle to acquire images outside the vehicle. The camera 310 may be a mono camera, a stereo camera 310a, an Around View Monitoring (AVM) camera 310b, or a 360-degree camera.

For example, the camera 310 may be disposed in proximity to the front windshield inside the vehicle in order to acquire front view images of the vehicle. Alternatively, the camera 310 may be disposed near a front bumper or a radiator grill.

For example, the camera 310 may be disposed in proximity to the rear glass inside the vehicle in order to acquire rear view images of the vehicle. Alternatively, the camera 310 may be disposed near a rear bumper, a trunk or a tail gate.

For example, the camera 310 may be disposed in proximity to at least any one of side windows inside the vehicle in order to acquire side view images of the vehicle. Alternatively, the camera 310 may be disposed near a side mirror, a fender or a door.

The camera 310 can provide the acquired images to the processor 370.

The radar 320 may include electromagnetic wave transmitter and receiver. The radar 320 may be implemented in a pulse radar manner or a continuous wave radar manner in terms of an electromagnetic wave emission principle. The radar 320, in the continuous wave radar manner, may be implemented in a frequency modulated continuous wave (FMCW) manner or a frequency shift keying (FSK) manner, depending on signal waveforms.

The radar 320 can detect an object through electromagnetic waves based on a TOF (Time of Flight) manner or a phase shift manner and detect the position of the detected object, the distance to the detected object, and a relative speed with respect to the detected object.

The radar 320 may be disposed at an appropriate position outside the vehicle in order to detect objects positioned ahead of, behind or on the side of the vehicle.

The lidar 330 may include laser transmitter and receiver. The lidar 330 may be implemented in a TOF manner or a phase shift manner.

The lidar 330 may be implemented in a driven type or a non-driven type.

When implemented in a driven type, the lidar 330 is rotated by a motor and can detect an object around the vehicle 100.

When implemented in a non-driven type, the lidar 330 can detect an object positioned within a predetermined range from the vehicle 100 according to light steering. The vehicle 100 may include a plurality of non-drive type lidars 330.

The lidar 330 can detect an object through a laser beam based on a TOF (Time of Flight) manner or a phase shift manner and can detect the position of the detected object, the distance to the detected object, and a relative speed with respect to the detected object.

The lidar 330 may be disposed at an appropriate position outside the vehicle in order to detect objects positioned ahead of, behind or on the side of the vehicle.

The ultrasonic sensor 340 may include ultrasonic wave transmitter and receiver. The ultrasonic sensor 340 can detect an object based on an ultrasonic wave and can detect the position of the detected object, the distance to the detected object, and a relative speed with respect to the detected object.

The ultrasonic sensor 340 may be disposed at an appropriate position outside the vehicle in order to detect objects positioned ahead of, behind or on the side of the vehicle.

The infrared sensor 350 may include infrared transmitter and receiver. The infrared sensor 350 can detect an object based on infrared light and can detect the position of the detected object, the distance to the detected object, and a relative speed with respect to the detected object.

The infrared sensor 350 may be disposed at an appropriate position outside the vehicle in order to detect objects positioned ahead of, behind or on the side of the vehicle.

The processor 370 can control the general operation of each unit of the object detection device 300.

The processor 370 can detect and track an object based on an acquired image. The processor 370 can perform operations such as calculating the distance from an object and a relative speed to an object through an image processing algorithm.

The processor 370 can detect and track an object based on a reflective electromagnetic wave that is an electromagnetic wave transmitted and returned after being reflected by an object. The processor 370 can perform operations such as calculating the distance from an object and a relative speed to an object based on an electromagnetic wave.

The processor 370 can detect and track an object based on reflective laser light that is laser light transmitted and returned after being reflected by an object. The processor 370 can perform operations such as calculating the distance from an object and a relative speed to an object based on laser light.

The processor 370 can detect and track an object based on an ultrasonic wave that is an ultrasonic wave transmitted and returned after being reflected by an object. The processor 370 can perform operations such as calculating the distance from an object and a relative speed to an object based on an ultrasonic wave.

The processor 370 can detect and track an object based on reflective infrared light that is infrared light transmitted and returned after being reflected by an object. The processor 370 can perform operations such as calculating the distance from an object and a relative speed to an object based on infrared light.

Depending on embodiments, the object detection device 300 may include a plurality of processors 370 or may not include the processor 370. For example, the camera 310, the radar 320, the lidar 330, the ultrasonic sensor 340, and the infrared sensor 350 each may individually include a processor.

When the processor 370 is not included in the object detection device 300, the object detection device 300 can be operated in accordance with control of a processor of a device in the vehicle 100 or the control portion 170.

The object detection device 300 can be operated in accordance with control of the control portion 170.

The communication device 400 is a device for performing communication with an external device. Here, the external device may be another vehicle, a mobile terminal, or a server.

The communication device 400 may include at least any one of a transmission antenna, a reception antenna, a radio frequency (RF) circuit which can implement various communication protocols, and an RF element in order to perform communication.

The communication device 400 may include a short range communication portion 410, a position information portion 420, a V2X communication portion 430, an optical communication portion 440, a broadcast transcribing portion 450, and a processor 470.

Depending on embodiments, the communication device 400 may further include components other than the components described in the specification or may not include some of the described components.

The short range communication portion 410 is a unit for short range communication. The short range communication portion 410 can support short range communication using at least one of Bluetooth™, Radio Frequency Identification (RFID), Infrared Data Association (IrDA), Ultra WideBand (UWB), ZigBee, Near Field Communication (NFC), Wireless-Fidelity (Wi-Fi), Wi-Fi Direct, and Wireless Universal Serial Bus (Wireless USB).

The short range communication portion 410 can perform short range communication between the vehicle 100 and at least one external device by forming a wireless area network.

The position information portion 420 is a unit for acquiring position information of the vehicle 100. For example, the position information portion 420 may include a Global Positioning System (GPS) module or a Differential Global Positioning System (DGPS) module.

The V2X communication portion 430 is a unit for wireless communication with a server V2I: Vehicle to Infra), another vehicle (V2V: Vehicle to Vehicle), or a pedestrian (V2P: Vehicle to Pedestrian). The V2X communication portion 430 may include an RF circuit that can implement protocols for communication with an infra (V2I), communication between vehicles (V2V), and communication with a pedestrian (V2P).

The optical communication portion 440 is a unit for performing communication with an external device through light. The optical communication portion 440 may include an optical transmitter that converts and emits an electrical signal as an optical signal and an optical receiver that converts a received optical signal into an electrical signal.

Depending on embodiments, the optical transmitter may be formed integrally with a lamp included in the vehicle 100.

The broadcast transceiver 450 may include a unit for receiving broadcast signals from an external broadcast management server or transmitting broadcast signals to a broadcast management server through a broadcast channel. The broadcast channel may include a satellite channel and a terrestrial channel. The broadcast signals may include a TV broadcast signal, a radio broadcast signal, a data broadcast signal.

The processor 470 can control the general operation of each unit of the communication device 400.

Depending on embodiments, the communication device 400 may include a plurality of processors 470 or may not include the processor 470.

When the processor 470 is not included in the communication device 400, the communication device 400 can be operated in accordance with control of a processor of another device in the vehicle 100 or the control portion 170.

Meanwhile, the vehicle communication module 400 can implement an automotive display device in cooperation with the user interface device 200. In this case, the automotive display device may be referred to as a telematics device or an Audio Video Navigation (AVN) device.

The communication device 400 can be operated in accordance with control of the control portion 170.

The driving operation device 500 is a device that receives user input for driving.

In a manual mode, the vehicle 100 may be driven based on a signal provided by the driving operation device 500.

The driving operation device 500 may include a steering input device 510, an acceleration input device 530, and a brake input device 570.

The steering input device 510 can receive driving direction input of the vehicle 100 from a user. It is preferable that the steering input device 510 is formed in a wheel shape so that steering input is possible by rotation. Depending on embodiments, the steering input device may be formed in the type of a touch screen, a touch pad, or a button.

The acceleration input device 530 can receive input for acceleration of the vehicle 100 from a user. The brake input device 570 can receive input for deceleration of the vehicle 100 from a user. It is preferable that the acceleration input device 530 and the brake input device 570 are formed in pedal types. Depending on embodiments, the acceleration input device or the brake input device may be formed in the type of a touch screen, a touch pad, or a button.

The driving operation device 500 can be operated in accordance with control of the control portion 170.

The vehicle driving device 600 is a device that electrically controls driving of various devices in the vehicle 100.

The vehicle driving device 600 may include a powertrain driving portion 610, a chassis driving portion 620, a door/ window driving portion 630, a safety device driving portion 640, a lamp driving portion 650, and an air-conditioning driving portion 660.

Depending on embodiments, the vehicle driving device 600 may further include components other than the components described in the specification or may not include some of the described components.

Meanwhile, the vehicle driving device 600 may include a processor. Each unit of the vehicle driving device 600 may individually include a processor.

The powertrain driving portion 610 can control the operation of a powertrain device.

The powertrain driving portion 610 may include power source driving portion 611 and a transmission driving portion 612.

The power source driving portion 611 can perform control for a power source of the vehicle 100.

For example, when a fossil fuel-based engine is a power source, the power source driving portion 611 can perform electronic control for the engine. Accordingly, it is possible to control output torque of the engine, etc. The power source driving portion 611 can adjust engine output torque in accordance with control of the control portion 170.

For example, when an electrical energy-based motor is a power source, the power source driving portion 611 can perform control for the motor. The power source driving portion 611 can adjust engine the rotational speed, torque, etc. of a motor in accordance with control of the control portion 170.

The transmission driving portion 612 can perform control for a transmission.

The transmission driving portion 612 can adjust the state of a transmission. The transmission driving portion 612 can adjust the state of a transmission into forward driving (D), rearward driving (R), neutral (N), or parking (P).

Meanwhile, when an engine is a power source, the transmission driving portion 612 can adjust the engagement state of gears in the forward-driving (D) state.

The chassis driving portion 620 can control the operation of a chassis device.

The chassis driving portion 620 may include a steering driving portion 621, a brake driving portion 622, and a suspension driving portion 623.

The steering driving portion 621 can perform electronic control for a steering apparatus in the vehicle 100. The steering driving portion 621 can change the driving direction of a vehicle.

The brake driving portion 622 can perform electronic control for a brake apparatus in the vehicle 100. For example, it is possible to reduce the speed of the vehicle 100 by controlling the operations of brakes disposed at wheels.

Meanwhile, the brake driving portion 622 can individually control each of a plurality of brakes. The brake driving portion 622 can differently control brake forces applied to a plurality of wheels The suspension driving portion 623 can perform electronic control for a suspension apparatus in the vehicle 100. For example, when there is a curve on a road, the suspension driving portion 623 can control vibration of the vehicle to decrease by controlling a suspension apparatus.

Meanwhile, the suspension driving portion 623 can individually control each of a plurality of suspensions.

The door/window driving portion 630 can perform electronic control for a door apparatus or a window apparatus in the vehicle 100.

The door/window driving portion 630 may include a door driving portion 631 and a window driving portion 632.

The door driving portion 631 can perform control for the door apparatus. The door driving portion 631 can control opening and closing of a plurality of door included in the vehicle 100. The door driving portion 631 can control opening or closing of a trunk or a tail gate. The door driving portion 631 can control opening of closing of a sunroof.

The window driving portion 631 can perform electronic control for the window apparatus. It is possible to control opening or closing of a plurality of windows included in the vehicle 100.

The safety driving portion 640 can perform electronic control for various safety apparatuses in the vehicle 100.

The safety driving portion 640 may include an airbag driving portion 641, a seatbelt driving portion 642, and a pedestrian protection device driving portion 643.

The airbag driving portion 641 can perform electronic control for an airbag apparatus in the vehicle 100. For example, the airbag driving portion 641 can control an airbag to inflate when a danger is sensed.

The seatbelt driving portion 642 can perform electronic control for a seatbelt apparatus in the vehicle 100. For example, the seatbelt driving portion 642 can control passengers to be fixed to seats 110FL, 110FR, 110RL, and 110RR using seatbelts when a danger is sensed.

The pedestrian protection device driving portion 643 can perform electronic control for a hood lift and a pedestrian airbag. For example, the pedestrian protection device driving portion 643 can control a hood lift to move up and the pedestrian airbag to inflate when the vehicle collides with a pedestrian.

The lamp driving portion 650 can perform electronic control for various lamp apparatuses in the vehicle 100.

The air-conditioning driving portion 660 can perform electronic control for a an air conditioner in the vehicle 100. For example, when the temperature of the interior of the vehicle is high, the air-conditioning driving portion 660 can control the air conditioner such that cold air is supplied to the interior of the vehicle.

The vehicle driving device 600 may include a processor. Each unit of the vehicle driving device 600 may individually include a processor.

The vehicle driving device 600 can be operated in accordance with control of the control portion 170.

The running system is a system that controls various types of running of the vehicle 100. The running system 700 can operate in the autonomous mode.

The running system 700 may include a traveling system 710, an exiting system 740, and a parking system 750.

Depending on embodiments, the running system 700 may further include components other than the above components and may not include some of the above components.

Meanwhile, the running system 700 may include a processor. Each unit of the running system 700 may individually include a processor.

Meanwhile, depending on embodiments, when the running system 700 is implemented in a software type, it may be a lower concept of the control portion 170.

Meanwhile, depending on embodiments, the running system 700 may be a concept including at least any one of the user interface device 200, the object detection device 300, the communication device 400, the vehicle driving device 600, and the control portion 170.

The traveling system 710 can perform traveling of the vehicle 100.

The traveling system 710 can perform traveling of the vehicle 100 by receiving navigation information from a navigation system 770 and providing a control signal to the vehicle driving device 600.

The traveling system 710 can perform traveling of the vehicle 100 by receiving object information from the object detection device 300 and providing a control signal to the vehicle driving device 600.

The traveling system 710 can perform traveling of the vehicle 100 by receiving a signal from an external device through the communication device 400 and providing a control signal to the vehicle driving device 600.

The exiting system 740 can perform exiting of the vehicle 100.

The exiting system 740 can perform exiting of the vehicle 100 by receiving navigation information from the navigation system 770 and providing a control signal to the vehicle driving device 600.

The exiting system 740 can perform exiting of the vehicle 100 by receiving object information from the object detection device 300 and providing a control signal to the vehicle driving device 600.

The exiting system 740 can perform exiting of the vehicle 100 by receiving a signal from an external device through the communication device 400 and providing a control signal to the vehicle driving device 600.

The parking system 750 can perform parking of the vehicle 100.

The parking system 750 can perform parking of the vehicle 100 by receiving navigation information from the navigation system 770 and providing a control signal to the vehicle driving device 600.

The parking system 750 can perform parking of the vehicle 100 by receiving object information from the object detection device 300 and providing a control signal to the vehicle driving device 600.

The parking system 750 can perform parking of the vehicle 100 by receiving a signal from an external device through the communication device 400 and providing a control signal to the vehicle driving device 600.

The navigation system 770 can provide navigation information. The navigation information may include at least one of map information, set destination information, route information according to the destination setting, information about various object on the route, lane information, and current position information of the vehicle.

The navigation system 770 may include a memory and a processor. The memory can store navigation information. The processor can control the operation of the navigation system 770.

Depending on embodiments, the navigation system 770 can update information stored before by receiving information from an external device through the communication device 400.

Depending on embodiments, the navigation system 770 may be classified as a lower component of the user interface device 200.

The sensing portion 120 can sense the state of the vehicle. The sensing portion 120 may include a posture sensor (e.g., a yaw sensor, a roll sensor, a pitch sensor), a collision sensor, a wheel sensor, a speed sensor, an inclination sensor, a weight sensor, a heading sensor, a gyro sensor, a position module, a vehicle forward/backward-movement sensor, a battery sensor, a fuel sensor, a tire sensor, a steering sensor for handle rotation, an in-vehicle temperature sensor, an in-vehicle humidity sensor, an ultrasonic sensor, an illumination sensor, an accelerator pedal position sensor, a brake pedal position sensor, etc.

The sensing portion 120 can acquire sensing signals about vehicle posture information, vehicle collision information, vehicle direction information, vehicle position information (GPS information), vehicle angle information, vehicle speed information, vehicle acceleration information, vehicle inclination information, vehicle forward/backward-movement information, battery information, fuel information, tire information, vehicle lamp information, in-vehicle temperature information, in-vehicle humidity information, a steering wheel rotation angle, out-vehicle illumination, pressure applied to an accelerator pedal, pressure applied to a brake pedal, etc.

The sensing portion 120 may further include an accelerator pedal sensor, a pressure sensor, an engine speed sensor, an air flow rate sensor (AFS), an intake air temperature sensor (ATS), a water temperature sensor (WTS), a throttle position sensor (TPS), a TDC sensor, a crank angle sensor (CAS), etc.

The interface portion 130 performs a passage function with various kinds of external devices connected to the vehicle 100. For example, the interface portion 130 may have a port that can be connected with a mobile terminal, and can be connected with the mobile terminal through the port. In this case, the interface portion 130 can exchange data with the mobile terminal.

Meanwhile, the interface portion 130 can perform a passage function that supplies electrical energy to the connected mobile terminal. When a mobile terminal is electrically connected to the interface portion 130, in accordance with control of the control portion 170, the interface portion 130 can provide electrical energy supplied from the power supply portion 190 to the mobile terminal.

The memory 140 is electrically connected with the control portion 170. The memory 140 can store basic data about units, control data for operation control of the units, and input/output data. Hardware-wise, the memory 140 may include various storage devices such as a ROM, a RAM, an EPROM, a flash drive, and a hard drive. The memory 140 can store various types of data for the overall operation of the vehicle 100, such as a program for processing or controlling of the control portion 170.

Depending on embodiments, the memory 140 may be integrally formed with the control portion 170 or may be implemented as a lower component of the control portion 170.

The control portion 170 can control the general operation of each unit in the vehicle 100. The control portion 170 may be referred to as an Electronic Contol Portion (ECU).

The power supply portion 190 can supply power for the operation of each component in accordance with control of the control portion 170. In particular, the power supply portion 190 can be supplied with power from a battery in the vehicle, etc.

One or more processors or control portions 170 included in the vehicle can be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for executing other functions.

Meanwhile, the vehicle 100 related with the present disclosure may include a vehicle control device 800.

The vehicle control device 800 can control at least one of the components described with reference to FIG. 7. In respect of this viewpoint, the vehicle control device 800 may be the control portion 170.

Not limited thereto, the vehicle control device 800 may be a separate component that is independent from the control portion 170. When the vehicle control device 800 is implemented as a component that independent from the control portion 170, the vehicle control device 800 may be disposed at a portion of the vehicle.

Hereafter, for the convenience of description, the vehicle control device 800 is described as a separate component that is independent from the control portion 170. Functions (operations) and a control method that are described in association with the vehicle control device 800 in the specification may be performed by the control portion 170 of the vehicle. That is, all description related to the vehicle control device 800 may be inferred and applied equally/similarly to the control portion 170.

Further, the vehicle control device 800 described in the specification may include some of the components described with reference to FIG. 7 and various components disposed in the vehicle. In the specification, for the convenience of description, the components described with reference to FIG. 7 and various components disposed in the vehicle are described with separate names and reference numerals.

Hereafter, a vehicle control device and method according to the present disclosure are described in more detail with reference to the accompanying drawings.

Figure 8:
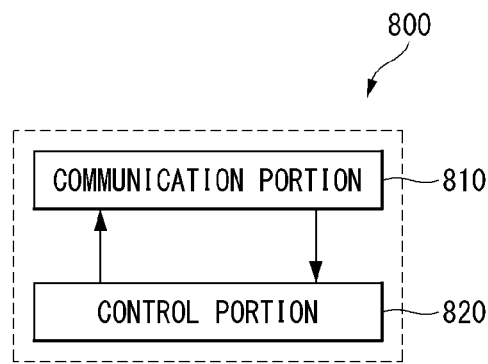
FIG. 8 is a block diagram showing an example of a vehicle control device according to the present disclosure.

FIG. 8 is a block diagram showing an example of a vehicle control device according to the present disclosure.

Referring to FIG. 8, a vehicle control device 800 according to the present disclosure is a device that controls a vehicle 100 platooning with at least one other vehicle, and includes a communication portion 810 and a control portion 820.

Platooning means that a plurality of continuous vehicles is driven close to each other through vehicle gap control. In this case, it is possible to exchange the positions, movement, and potential abnormal situation information of vehicles in a platooning group through communication among the vehicles. Further, it is possible to maintain the vehicle gaps through corresponding control.

As an embodiment, platooning can be performed in a manner of measuring position coordinates, driving direction angles, and driving speeds in real time using GPS and of exchanging the measurement information among the vehicle in platooning.

In this case, a vehicle that controls driving of the vehicles pertaining to the platooning by receiving the measurement information may be referred to as a leader vehicle. Further, vehicles that are controlled by the leader vehicle may be referred to as following vehicles.

The vehicle 100 platoons with at least one other vehicle and may be a leader vehicle or a following vehicle in the platooning.

The communication portion 810 is configured to perform communication with the various components described with reference to FIG. 7. For example, the communication portion 810 can receive various items of information that are provided through controller area network (CAN).

As another example, the communication portion 810 can perform communication with all devices that can perform communication such as a mobile terminal, a server, and another vehicle. This may be referred to a Vehicle to everything (V2X) communication. V2X communication may be defined as a technology that exchanges or shares information such as a traffic condition while communicating with a road infrastructure and another vehicle in driving.

Vehicle to Vehicle (V2V) communication may be understood as an example of V2X communication or may be understood as a concept included in V2X communication. That is, the communication portion 810 can perform communication with surrounding vehicles (or other vehicles). This may be referred to as V2V communication. V2V communication may be generally defined as a technology that enables vehicles to exchange information, and can share the position and speed information, etc. of surrounding vehicles.

As described above, the communication portion 810 can communicate with the at least one other vehicle.

The control portion 820 can calculate a sensing range allocated to each of the at least one other vehicle in the platooning based on the arrangement pattern of the platooning.

The arrangement pattern of the platooning may be defined in accordance with the position relationships among the vehicles forming the platooning. That is, it may be defined as a road occupation pattern by vehicle platooning, etc.

For example, in the arrangement pattern of the platooning, a single line arrangement in which vehicles forming platooning are continuously driven in a line or a multi-line arrangement in which vehicles are driven in several lanes.

The sensing range may be referred to as a sensing area allocated to each of vehicles forming platooning. Accordingly, each vehicle can sense data around the allocated sensing area.

As an embodiment, a first another vehicle pertaining to platooning may be allocated with a first area that is a first sensing range and a second another vehicle may be allocated with a second area that is a second sensing range.

Accordingly, the first another vehicle can sense data in the first area (first sensing range) using sensors such as a camera, a radar, and a lidar. Similarly, the second another vehicle can also sense data in the second area (second sensing range) using various sensors.

As described above, the sensing range allocated to each vehicle can be calculated based on the arrangement pattern of the platooning. In detail, the sensing range may be calculated in consideration of the position of a vehicle and the position of another vehicle in the arrangement of platooning and an area that requires sensing by the arrangement pattern of the platooning.

As another example, the sensing range may be allocated in consideration of a road shape, a driving direction, whether there is an accident, a traffic congestion situation, etc. A relevant detailed example will be described below.

As another embodiment, other vehicles pertaining to platooning can calculate sensing ranges in person and transmit the sensing ranges to a leader vehicle. Accordingly, the leader vehicle can correct the received sensing ranges not to overlap in consideration of the positions of the other vehicles.

Meanwhile, the communication part 810 can receive data sensed for the sensing range from the at least one other vehicle.

Accordingly, the control portion 820 can generate a control signal for controlling the platooning based on the data sensed for each sensing range.

As described above, the vehicle 100 may be a leader vehicle or a following vehicle in platooning, but is assumed as a leader vehicle hereafter for the convenience of description.

That is, the communication portion 810 can receive data sensed in sensing ranges allocated to following vehicles from the following vehicles. Further, the control portion 820 can generate a control signal for platooning by combining the received sensing data.

In the embodiment described above, the first another vehicle pertaining to the platooning may be allocated with a first area that is a first sensing range. Accordingly, the first another vehicle can sense that there is an obstacle in the first area (first sensing range) using sensors such as a camera, a radar, and a lidar.

As a result, the communication portion 810 can sense that there is an object in the first area (first sensing range) by communicating with the first other vehicle. Further, the control portion 820 can generate a control signal for avoiding the first area or decelerate.

In detail, it is possible to transmit a control signal for changing the driving direction to avoid the obstacle or for decelerating to the following vehicles.

According to the present disclosure, by allocating sensing ranges respectively to other vehicles forming platooning, there is no need for sensing the entire area. Accordingly, each of the following vehicles mainly senses a specific area, thereby being able to save communication resources.

Further, it is possible to select a vehicle having the most communication resources in reserve due to a small sensing range as a leader vehicle. As a result, the leader vehicle can transmit control information for platooning with a message using the saved resources.

Figure 9:
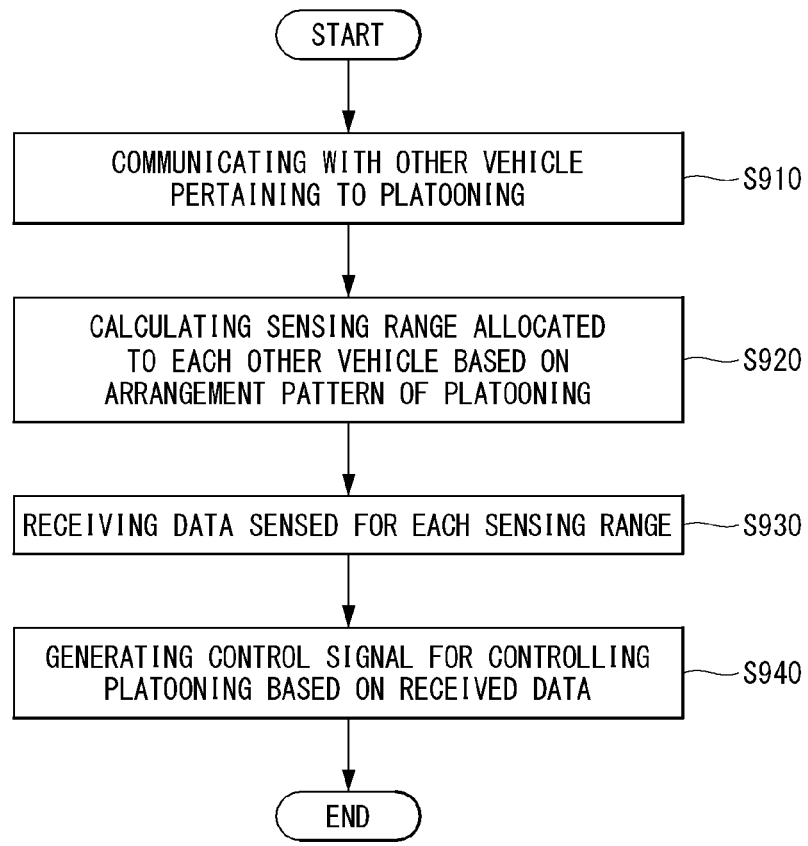
FIG. 9 is a flowchart showing an embodiment of a method for controlling a vehicle according to the present disclosure.

FIG. 9 is a flowchart showing an embodiment of a method for controlling a vehicle according to the present disclosure.

Referring to FIG. 9, as a method of controlling a vehicle 100 platooning with at least one other vehicle, a step (S910) of communicating with the at least one other vehicle is performed.

As an embodiment, the position, the ID (plate number), the speed, the acceleration, the vehicle kind, the sensor performance, data sensed during driving, etc. of the other vehicle can be received from the other vehicle.

Next, a step (S920) of calculating the sensing range allocated to the at least one other vehicle in the platooning based on the arrangement pattern of the platooning is performed.

As described above, the arrangement pattern of the platooning may be defined in accordance with the position relationships among the vehicles forming the platooning. That is, it may be defined as a road occupation pattern by vehicle platooning, etc.

Further, the sensing range may be referred to as a sensing area allocated to each of vehicles forming platooning. Accordingly, each vehicle can sense data around the allocated sensing area.

As an embodiment, each vehicle can sense only the allocated sensing area or can perform sensing with a weight added to the sensing area. In this case, the sensing area may be an area adjacent to a side where each vehicle is positioned in the platooning.

Next, a step (S930) of receiving data sensed for each sensing range from the at least one other vehicle may be performed.

Thereafter, a step (S940) of generating a control signal for controlling the platooning based on the data sensed for each sensing range may be performed.

As an embodiment, the leader vehicle 100 can determined the position of each following vehicle (other vehicle) and can filter the received sensing data for each position.

According to the present disclosure, it is possible to selectively exchange information sensed in accordance with the positions of an objective vehicle 100 and another vehicle that are driven in platooning. That is, by allocating and sharing a sensing arrange for each vehicle, the communication resources of each vehicle can be saved and the data exchange speed can be improved.

Hereafter, with reference to drawings, a detailed embodiment of the vehicle control device and a method for controlling the vehicle according to the present disclosure are described.

Meanwhile, the vehicle 100 may be positioned in an area having the smallest sensing range in the platooning.

Figure 10:
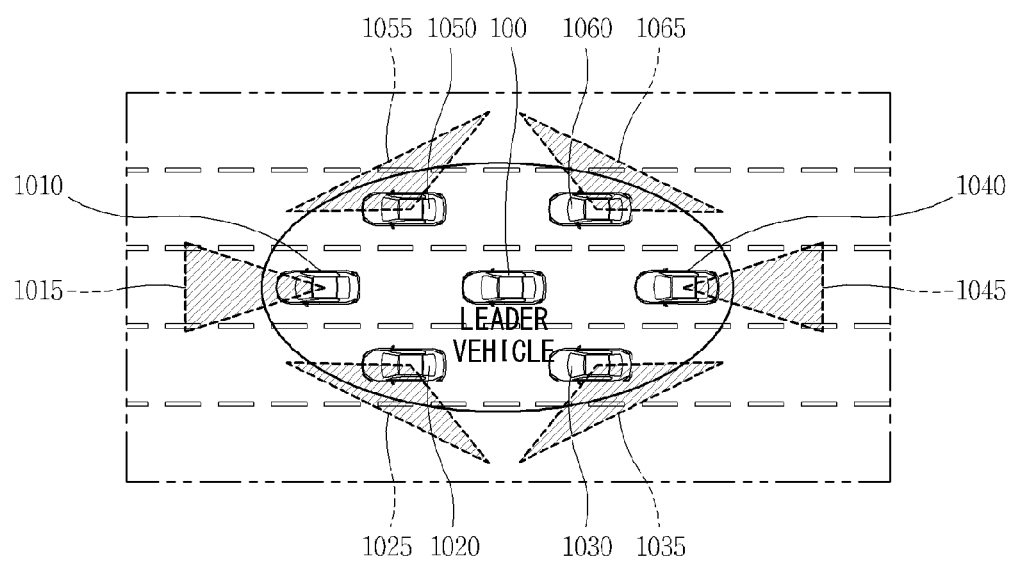
FIG. 10 is a conceptual view showing an embodiment in which sensing ranges of vehicles in platooning are allocated in accordance with the arrangement pattern of the platooning.

FIG. 10 is a conceptual diagram showing an embodiment in which sensing ranges of vehicles in platooning are allocated in accordance with the arrangement pattern of the platooning.

Referring to FIG. 10, the vehicle 100 and other vehicles 1010, 1020, 1030, 1040, 1050, and 1060 can platoon while maintaining an arrangement pattern surrounding the vehicle 100. In this case, the vehicle 100 may be set as a leader vehicle.

Further, the other vehicles 1010, 1020, 1030, 1040, 1050, and 1060 can be allocated with sensing ranges to sensing outside areas 1015, 1025, 1035, 1045, 1055, and 1065 of the platooning from their positions.

As an embodiment, a first other vehicle 1010 can be allocated with a front area 1015 as a sensing range and a fourth other vehicle 1040 can be allocated with a rear area 1045 as a sensing range.

Further, a second other vehicle 1020 can be allocated with a front left area 1025 as a sensing range and a third other vehicle 1030 can be allocated with a rear left area 1035 as a sensing range. Similarly, a fifth other vehicle 1050 can be allocated with a front right area 1055 as a sensing range and a sixth other vehicle 1060 can be allocated with a rear right area 1065 as a sensing range.

As described above, since sensing ranges are allocated, areas for platooning can be divided and sensed.

In this case, the vehicles 110, 1020, 1030, 1040, 1050, and 1060 at the front and sides of the platooning need to precisely sense the surround and transmit the result, so they need a lot of resources.

Accordingly, it is possible to select the vehicle 100, which has lots of communication resources in reserve due to the smallest sensing range, as a leader vehicle and the vehicle 100 can transmit control information for the platooning using the saved resources.

In FIG. 10, a sensing range may not be allocated to the vehicle 100. That is, the vehicle 100 may not perform sensing in person and may collect and use the information sensed by the other vehicles 1010, 1020, 1030, 1040, 1050, and 1060 for the platooning.

Meanwhile, the control portion 820 can set the position of at least one other vehicle in the platooning in consideration of the sensing performance of the at least one other vehicle.

Figure 11:
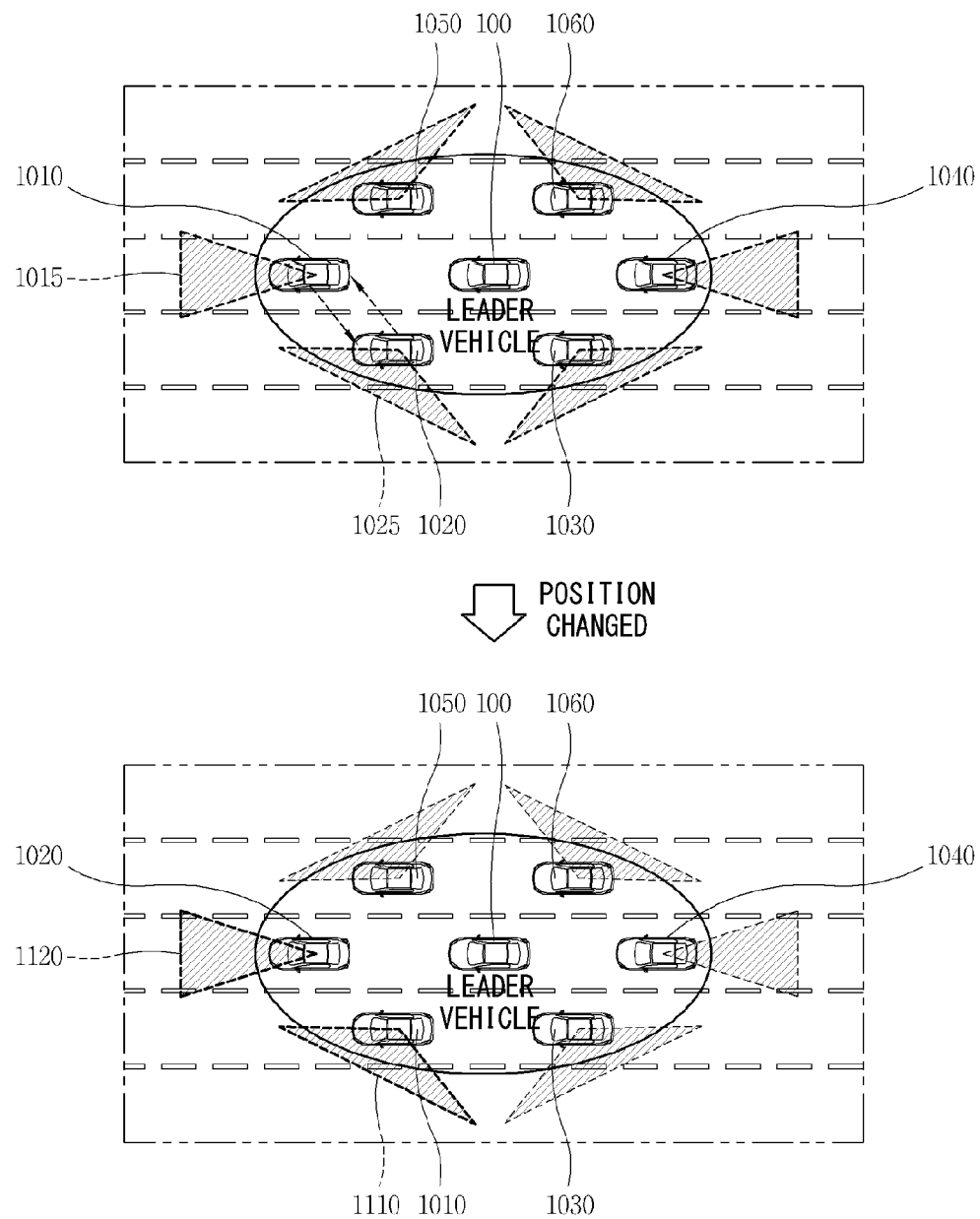
FIG. 11 is a conceptual view showing an embodiment in which the positions of vehicles in platooning are changed in consideration of sensing performance.

FIG. 11 is a conceptual view showing an embodiment in which the positions of vehicles in platooning are changed in consideration of sensing performance.

Referring to FIG. 11, as described with reference to FIG. 10, the vehicle 100 and other vehicles 1010, 1020, 1030, 1040, 1050, and 1060 can platoon while maintaining an arrangement pattern surrounding the vehicle 100. In this case, the vehicle 100 may be set as a leader vehicle.

Further, the other vehicles 1010, 1020, 1030, 1040, 1050, and 1060 can be allocated with sensing ranges to sensing outside areas of the platooning from their positions.

As an embodiment, a first other vehicle 1010 can be allocated with a sensing range and a second other vehicle 1020 can be allocated with a sensing range to sense a front area 1015 and a front left area 1025, respectively.

In this case, only a sensor that can sense the front may exist in the second other vehicle 1020, or the performance of a side sensor may be very low.

Accordingly, it is possible to switch the first other vehicle 1010 in which the performance of a side sensor is high and the second other vehicle 1020 by transmitting a control signal to the vehicle 100.

As a result, the sensing range of the first other vehicle 1010 can be changed from the front area 1015 to the front left area 1110. Further, the sensing range of the second other vehicle 1020 can be chanted from the front left area 1025 to the front area 1120.

Meanwhile, the control portion 820 can calculate the sensing range allocated to each of the at least one other vehicle in the platooning in consideration of the sensing performance of the at least one other vehicle.

That is, it is possible to reset the sensing ranges instead of switching the positions of other vehicles as in FIG. 11.

Figure 12:
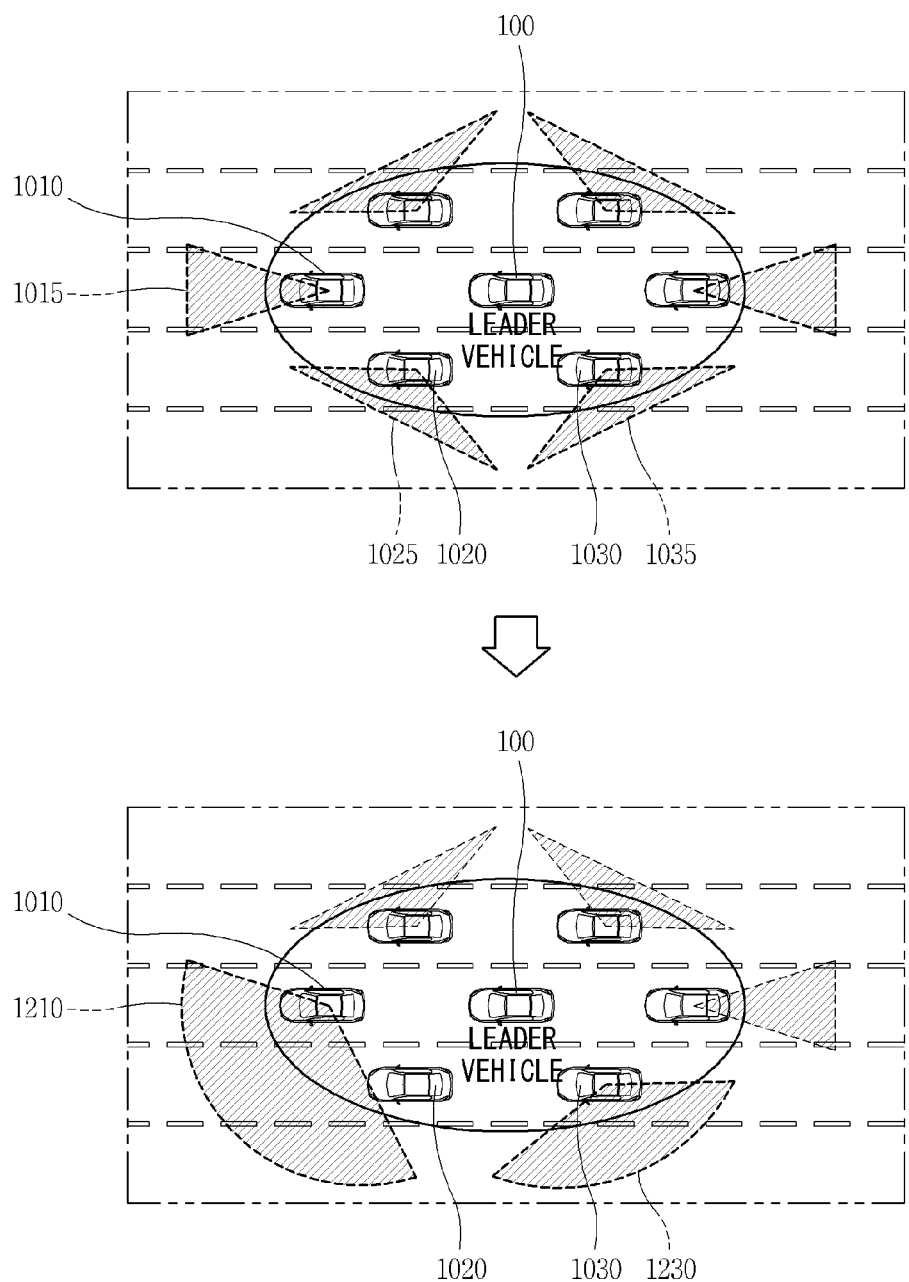
FIG. 12 is a conceptual diagram showing an embodiment in which sensing ranges of vehicles in platooning are allocated in consideration of sensing performance.

FIG. 12 is a conceptual diagram showing an embodiment in which sensing ranges of vehicles in platooning are allocated in consideration of sensing performance.

Referring to FIG. 12, as described with reference to FIG. 11, when only a sensor that can sense the front exists in the second other vehicle 1020 or the performance of a side sensor is very low, the front left area can be included in the sensing ranges of the first other vehicle 1010 and the third other vehicle 1030.

As an embodiment, the sensing range of the first other vehicle 1010 can be expanded to an area 1210 including the front area and a portion of the front left area. Further, the sensing range of the third other vehicle 1030 can be expanded to an area 1230 including the rear left area and a portion of the front left area.

That is, the first other vehicle 1010 and the third other vehicle 1030 can cooperatively sense the left area that the second other vehicle 1020 has difficulty in sensing.

As described above, according to the embodiments of FIGS. 11 and 12, it is possible to change the positions of other vehicles or change sensing ranges in accordance with sensing performance. Further, the sensing performance can be considered after forming of platooning or simultaneously with forming of platooning.

Meanwhile, when another vehicle comes out of the platooning group or new another vehicle comes into the platooning group, the control portion 820 can calculate the sensing range allocated to each of other vehicles pertaining to the reconstructed platooning group.

Figure 13:
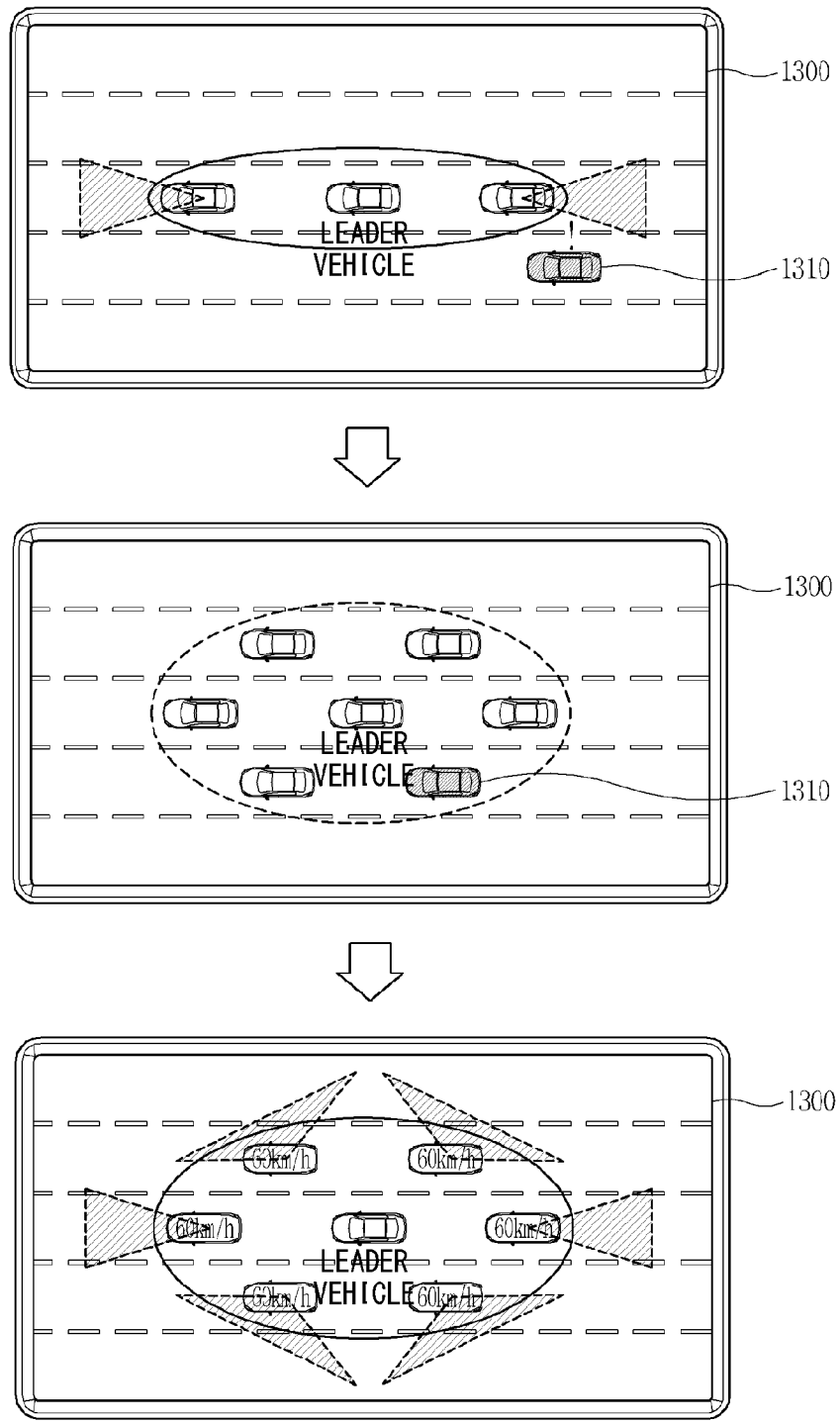
FIG. 13 is a conceptual view showing a user interface that is output on an image display device of a leader vehicle when a following vehicle is added to platooning.

FIG. 13 is a conceptual view showing a user interface that is output on an image display device of a leader vehicle when a following vehicle is added to platooning.

Referring to FIG. 13, the platooning group and the other vehicles pertaining to the platooning group can be output on an image display device 1300 of the leader vehicle 100.

In this case, when another vehicle approaches and requests to come into the platooning, an icon 1310 showing a request to come into the platooning can be output. For example, the icon 1310 is an icon of the another vehicle approaching the platooning and can be output with the same direction and speed as those actually approaching the platooning group.

Next, when the driver of the leader vehicle 10 selects the icon 1301 through clicking, etc., the another vehicle comes into the platooning, and a sensor kind and performance information of the another vehicle can be transmitted to the leader vehicle 100.

Accordingly, an optimal platooning arrangement pattern and the position of each of the other vehicles can be calculated in the leader vehicle 100 based on the sensor kinds, the performance information, the position information, etc. of the other vehicles pertaining to the platooning.

The calculated optimal platooning arrangement pattern and position of each of the other vehicles can be output on the image display device 1300. When the driver of the leader vehicle 100 selects a calculated platooning type (arrangement pattern, positions of other vehicles, etc.) through clicking, etc., an instruction message saying move to corresponding positions can be transmitted to each of the other vehicles.

Thereafter, when the platooning arrangement is completed, a sensing range allocated to each of the other vehicles can be displayed. Further, state information of each of the other vehicles such as a speed, lane information, and position information can also be briefly displayed.

Figure 14:
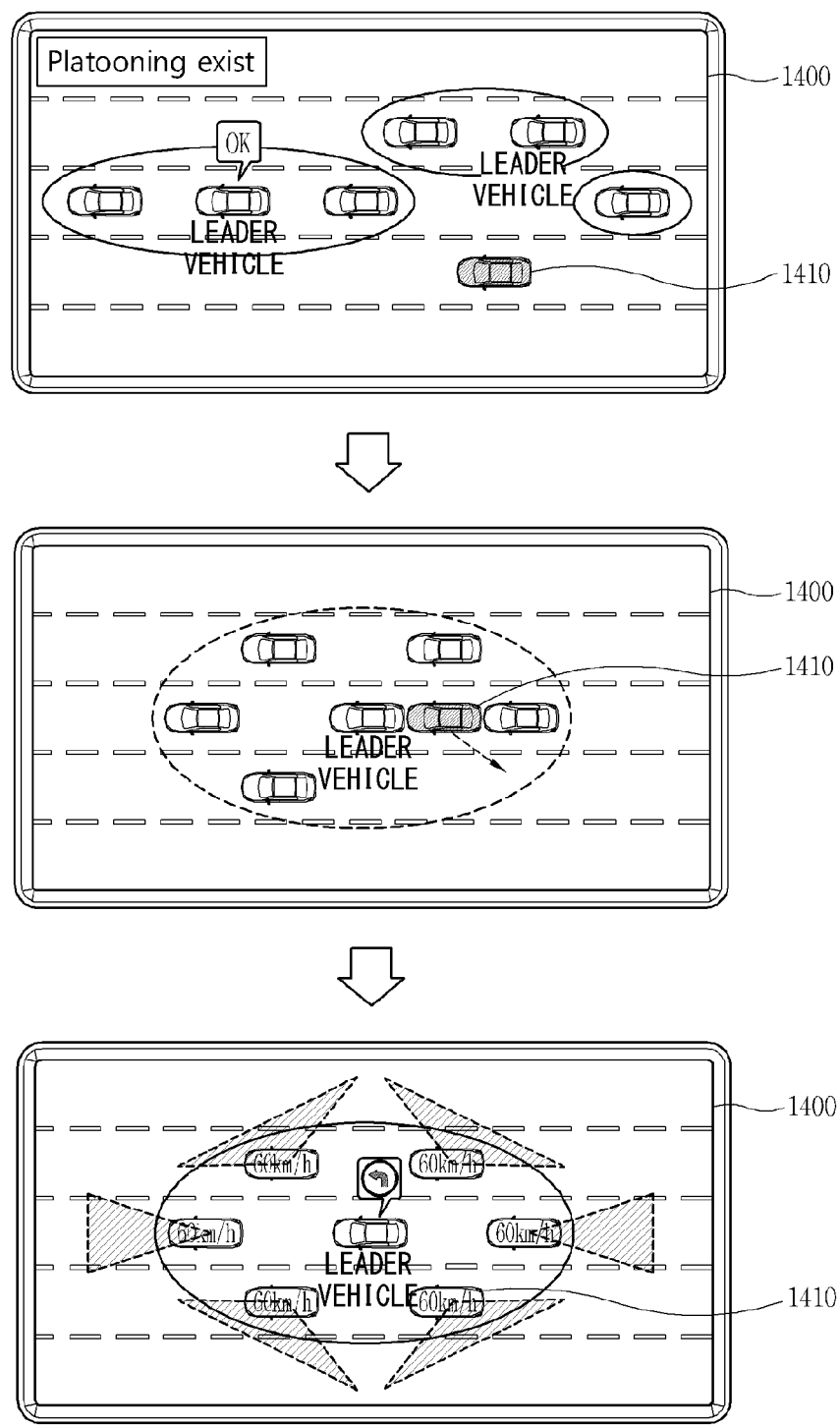
FIG. 14 is a conceptual view showing a user interface that is output on an image display device of a following vehicle when a following vehicle is added to platooning.

FIG. 14 is a conceptual view showing a user interface that is output on an image display device of a following vehicle when a following vehicle is added to platooning.

Referring to FIG. 14, when another vehicle wants platooning, another vehicle icon 1410 and surrounding platooning groups can be output on an image display device 1400 of the another vehicle.

The driver of the another vehicle can select a platooning group to join through clicking, etc., and can receive a joining approval message from the leader vehicle 100 of the corresponding platooning group.

When the another vehicle joins the platooning, position information, the sensor kind, sensor performance information, etc. of the another vehicle can be transmitted to the leader vehicle 100, and the leader vehicle 100 can transmit a message for moving the position to the another vehicle.

As an embodiment, guide information guiding position movement received from the leader vehicle 100 can be output on the image display device 1400 of the another vehicle. In detail, an arrow showing a movement direction may be displayed and the another vehicle can driven manually or autonomously in the movement direction.

Thereafter, when the platooning arrangement is completed, a sensing range allocated to each of the other vehicles can be displayed. Further, state information of each of the other vehicles such as the speed, lane information, and position information and the driving information (driving direction and TBT information) of the leader vehicle 100 can be briefly displayed.

Figure 15:
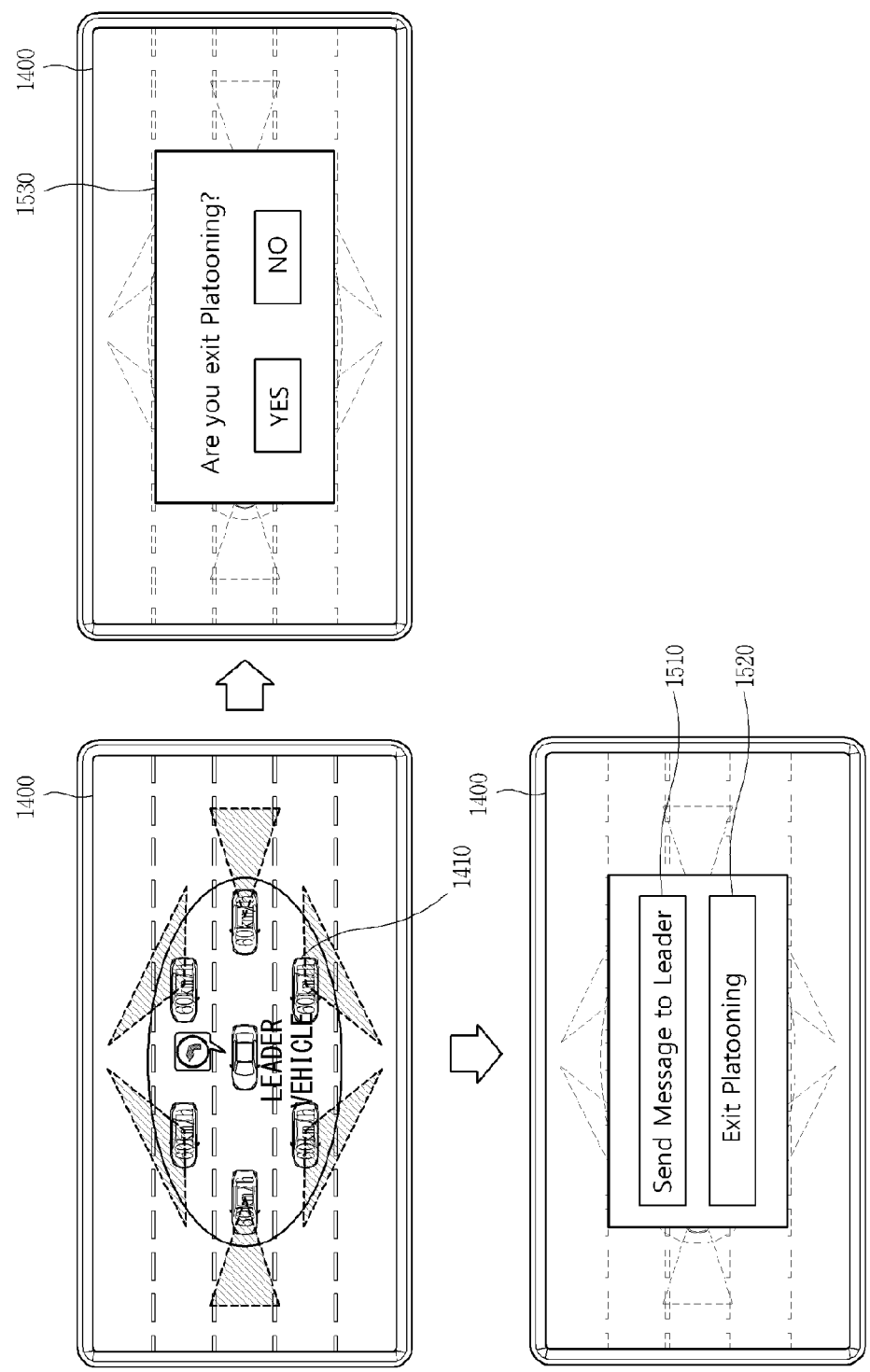
FIG. 15 is a conceptual view showing a user interface that is output on an image display device of a following vehicle when a following vehicle comes out of platooning.

FIG. 15 is a conceptual view showing a user interface that is output on an image display device of a following vehicle when a following vehicle comes out of platooning.

Referring to FIG. 15, when a vehicle wants to come out of the platooning, the driver of the vehicle gives predetermined input, thereby being able to output selectable manus on the image display device 1400 of the vehicle.

As an embodiment, a menu 1510 for sending a message to the leader vehicle 100 or a message 1520 coming out of the platooning may be output. In this case, when the driver of the vehicle applies touch input to the menu 1510 that separates the vehicle from platooning, a message for separation can be transmitted to the leader vehicle 100.

As another embodiment, when the vehicle comes out of the area in the platooning or comes out of the communication range of the platooning group, a message 1530 for asking about wanting to come out of the platooning group can be output.

Accordingly, when separation from the platooning is selected or there is not selection of an answer, a separation message can be transmitted to the leader vehicle 100.

As another example, when the vehicle comes out of the range in the platooning group or comes out of the communication range of the platooning group without an answer, the leader vehicle 100 can exclude the vehicle from the platooning.

Figure 16:
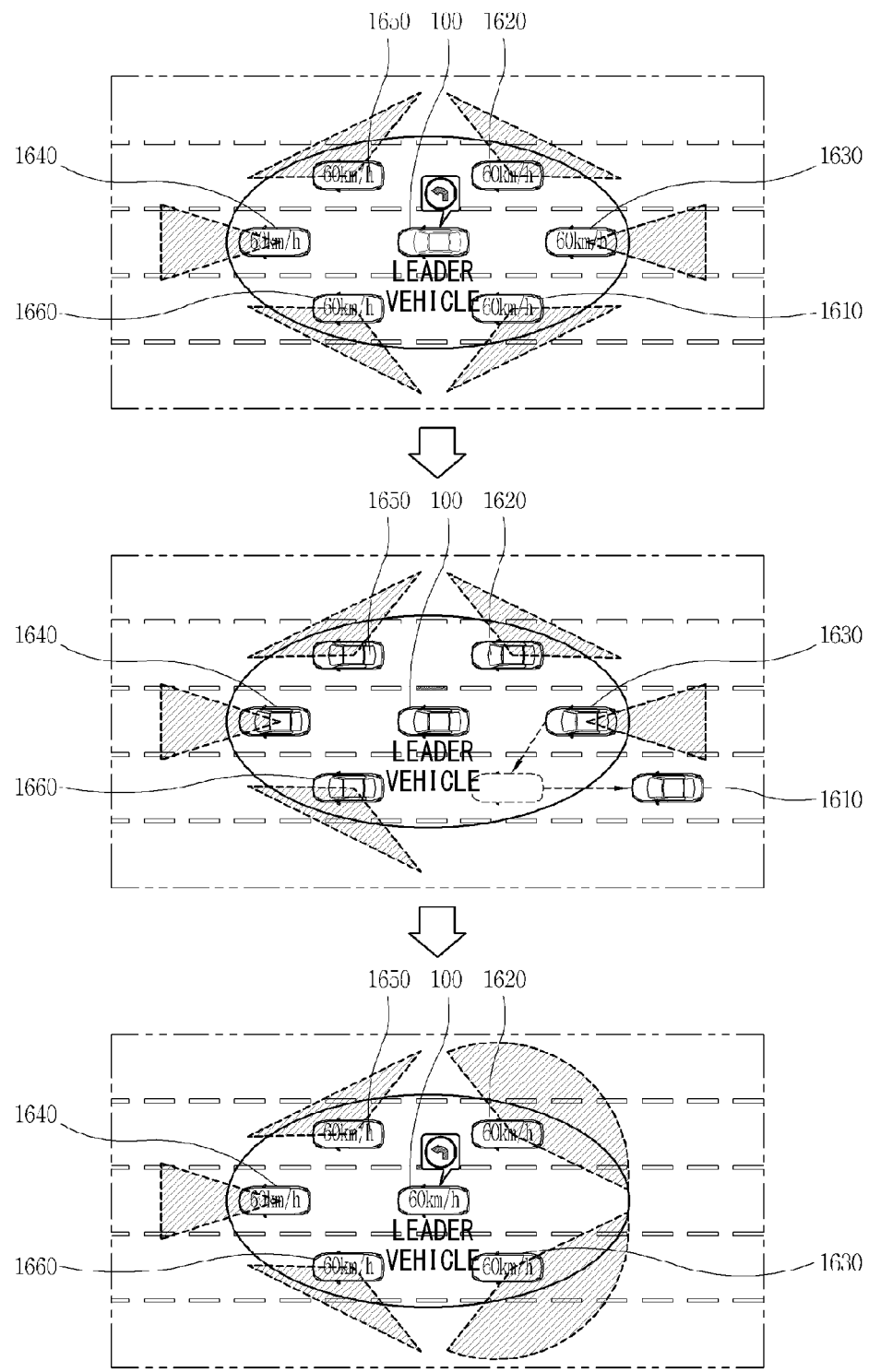
FIG. 16 is a conceptual view showing an embodiment in which sensing ranges of vehicles in platooning are reset when a following vehicle comes out of the platooning.

FIG. 16 is a conceptual view showing an embodiment in which sensing ranges of vehicles in platooning are reset when a following vehicle comes out of the platooning.

Referring to FIG. 16, following vehicles 1610, 1620, 1630, 1640, 1650, and 1660 may be disposed around a leader vehicle 100 and a sensing range can be allocated to each of the following vehicles 1610, 1620, 1630, 1640, 1650, and 1660.

In this case, when a separation message is transmitted from a first other vehicle 1610 or the first other vehicle 1610 comes out of the communication range in the platooning group, it is possible to exclude the first other vehicle 1610 from the platooning.

The leader vehicle 100 can rearrange the other following vehicles 1620, 1630, 1640, 1650, and 1660 or can recalculate the sensing ranges based on the sensing performance, the sensor kind, the position information, etc. of the other following vehicles 1620, 1630, 1640, 1650, and 1660.

As an embodiment, it is possible to transmit a control signal saying move to the rear left to the third other vehicle 1630. Further, it is possible to set the sensing range of the third other vehicle 1630 to include even the rear left area from the rear area. Further, it is possible to set the sensing range of the second other vehicle 1620 to include a wider rear area from the rear right area.

As described above, referring to FIGS. 15 and 16, when a vehicle in a group comes out of a predetermined range or more or comes out of the group by requesting to separate from the group, it is possible to deploy another vehicle that can replace sensing that the vehicle has performed, or it is possible to change the platooning formation. Alternatively, it is possible to change the sensing ranges of the other vehicles.

Meanwhile, when the arrangement pattern of the platooning is changed, the control portion 820 can recalculate a sensing range allocated to each of the at least one other vehicle in the platooning.

In this case, the control portion 820 can generate a control signal for positioning the vehicle in the area having the smallest sensing range in the platooning.

As described above, platooning can be classified into single-line platooning or multi-line platooning in accordance with whether vehicles are driven in one line or several lines. In the multi-line platooning, when a driving direction is changed or a lane is changed, it is difficult to control several vehicles.

Figure 17:
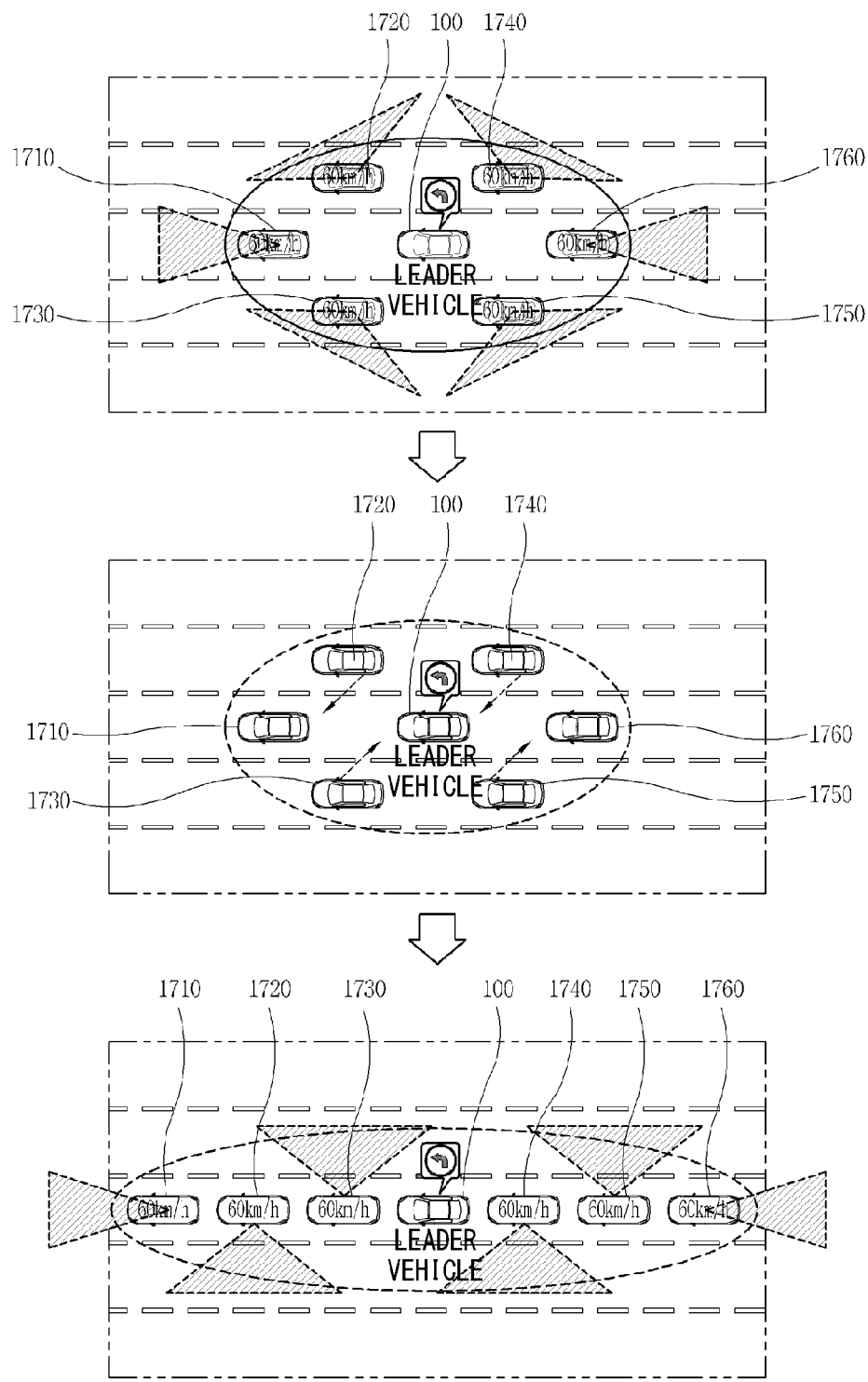
FIG. 17 is a conceptual diagram showing an embodiment in which sensing ranges of vehicles in platooning are reset in accordance with a change of the arrangement pattern of the platooning.

FIG. 17 is a conceptual diagram showing an embodiment in which sensing ranges of vehicles in platooning are reset in accordance with a change of the arrangement pattern of the platooning.

Referring to FIG. 17, following vehicles 1710, 1720, 1730, 1740, 1750, and 1760 can platoon while maintaining an arrangement pattern surrounding a leader vehicle 100.

As an embodiment, when a platooning groups intends to turn left, the leader vehicle 100 can change the arrangement pattern of the platooning into a single line.

To this end, it is possible to transmit a message saying move to all or some following vehicles 1720, 1730, 1740, and 1750. A movement direction or speed may be included in the movement message, and accordingly, some following vehicles 1720, 1730, 1740, and 1750 can move to corresponding positions.

When the arrangement pattern is changed into single-line platooning, the sensing ranges that all or some following vehicles 1720, 1730, 1740, and 1750 can be changed.

As an embodiment, the sensing range of the second following vehicle 1720 can be changed from the right front area to the left area. Similarly, the sensing range of the third following vehicle 1730 may be changed from the left front area to the right area, the sensing range of the fourth following vehicle 1740 may be changed from the right rear area to the left area, and the sensing range of the fifth following vehicle 1750 may be changed from the left rear area to the right area.

As another embodiment, the leader vehicle 100 may be positioned in an area with the smallest sensing range. That is, as the following vehicles 1710, 1720, 1730, 1740, 1750, and 1760 are respectively allocated with the front, sides, and rear of the platooning and sense the areas, the leader vehicle 100 can control the platooning by receiving the sensing result without sensing the areas in person.

As another embodiment, when the arrangement of platooning is changed, a leader vehicle can be newly selected. In detail, a leader positioned in an area with the smallest sensing range in single platooning can be selected as a leader vehicle. Alternatively, the front vehicle in single platooning may be selected as a leader vehicle.

Meanwhile, the platooning group is divided into a plurality of groups, the control portion 820 can calculate the sensing range allocated to each of other vehicles pertaining to the same group of the vehicle 100 of the plurality of groups.

In platooning, a case in which it is required to divide or combine platooning groups due to influence of a communication area, standby for a traffic signal may occur, etc.

Figure 18:
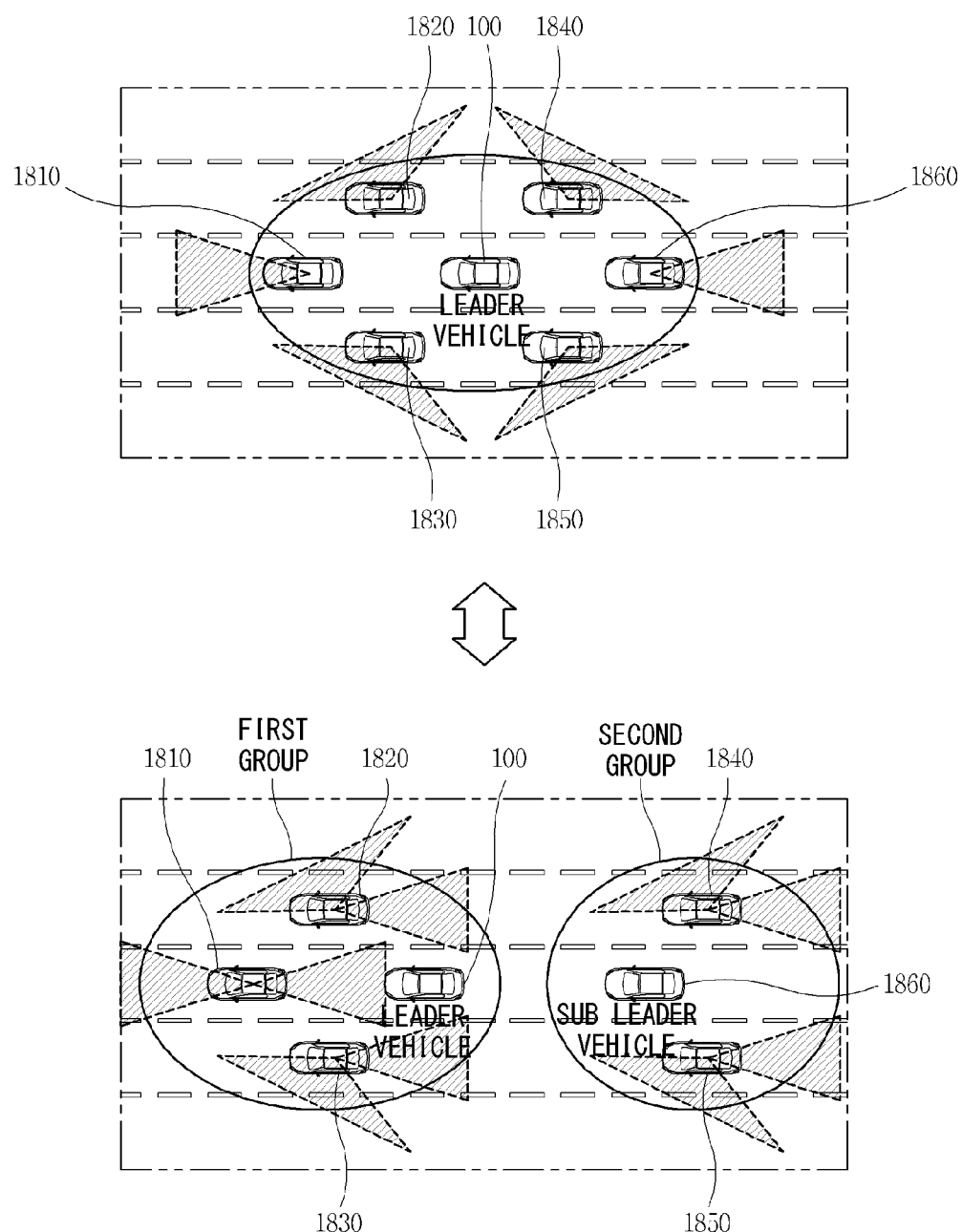
FIG. 18 is a conceptual diagram showing an embodiment in which sensing ranges of vehicles in platooning are reset as the platooning is divided into several platooning groups.

FIG. 18 is a conceptual diagram showing an embodiment in which sensing ranges of vehicles in platooning are reset as the platooning is divided into several platooning groups.

Referring to FIG. 18, following vehicles 1810, 1820, 1830, 1840, 1850, and 1860 can platoon while maintaining an arrangement pattern surrounding a leader vehicle 100.

In this case, the platooning group may be divided into a first group and a second group due to influence of a communication area, standby for a traffic signal may occur, etc. Alternatively, divided groups may be combined back into one.

As an embodiment, a leader vehicle 100, a first following vehicle 1810, a second following vehicle 1820, and a third following vehicle 1830 may be included in the first group. A rear area may be added to the sensing range of the each of the following vehicles 1810, 1820, and 1830.

Further, a fourth following vehicle 1840, a fifth following vehicle 1850, and a sixth following vehicle 1860 may be included in the other second group, and the sixth following vehicle 1860 may be newly selected as a leader vehicle 1860.

In the second group, the fourth following vehicle 1840 can be allocated the front right area and the rear area as a sensing range and the fifth following vehicle 1850 can be allocated with the front left area and the rear area as a sensing range.

As an embodiment, the leader vehicle 100 and 1860 of the first group and the second group can maintain the first group and the second group within a predetermined distance while communicating with each other.

Accordingly, the leader vehicle 1860 of the second group can receive data obtained by sensing the front (data obtained by sensing the rear in the first group) from the leader vehicle 100 of the first group, instead of sensing the front area.

Meanwhile, the vehicle 100 may be a vehicle of which the sensing performance is lower than that of at least one other vehicle pertaining to the platooning group.

Figure 19:
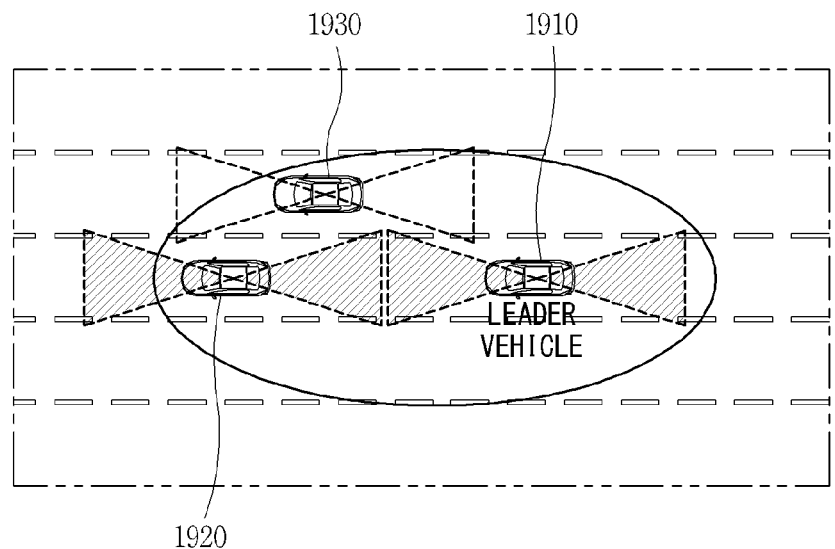
FIG. 19 is a conceptual view showing an embodiment in which a leader vehicle is changed in consideration of sensing performance.
Figure 19:
Figure 19:
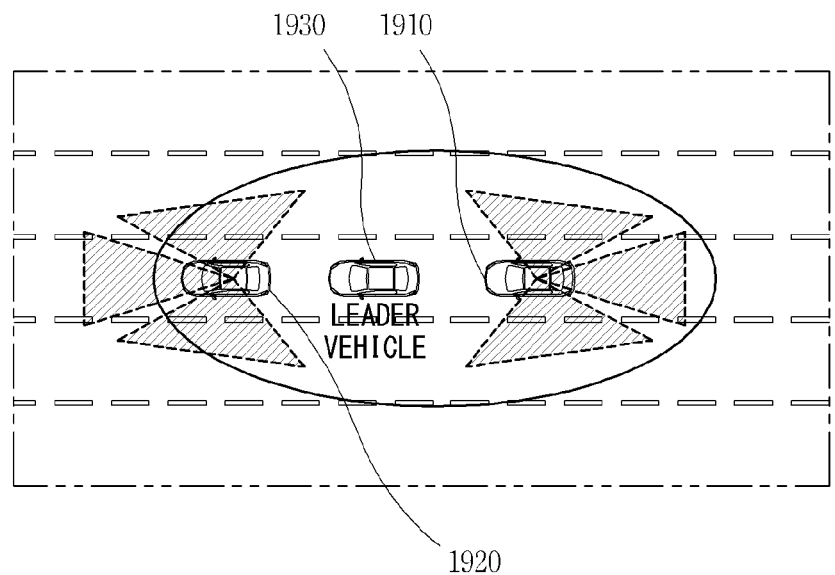

FIG. 19 is a conceptual view showing an embodiment in which a leader vehicle is changed in consideration of sensing performance.

Referring to FIG. 19, a first vehicle 1910, a second vehicle 1920, and a third vehicle 1930 that are leader vehicle can platoon, in which the first vehicle 1910 and the second vehicle 1920 can sense the front and the rear, respectively.

As an embodiment, when the sensing performance of the third vehicle 1930 is low, the first vehicle 1910 can transmit a message saying move to an area with the smallest sensing range to the third vehicle 1930.

Accordingly, the second vehicle 1920 can be allocated with the front, the front left area, and the front right area as a sensing range. Further, the first vehicle 1910 can be allocated with the rear, the rear left area, and the rear right area as a sensing range.

That is, it is possible to expand the sensing ranges of the other vehicles 1920 and 1910 to replace the third vehicle 1930 having insufficient sensing performance, and it is possible to select the third vehicle 1930 as a leader vehicle.

Meanwhile, the control portion 820 can recalculate a sensing range allocated to each of the at least one other vehicle in the platooning in consideration of the driving direction of the platooning group.

Figure 20:
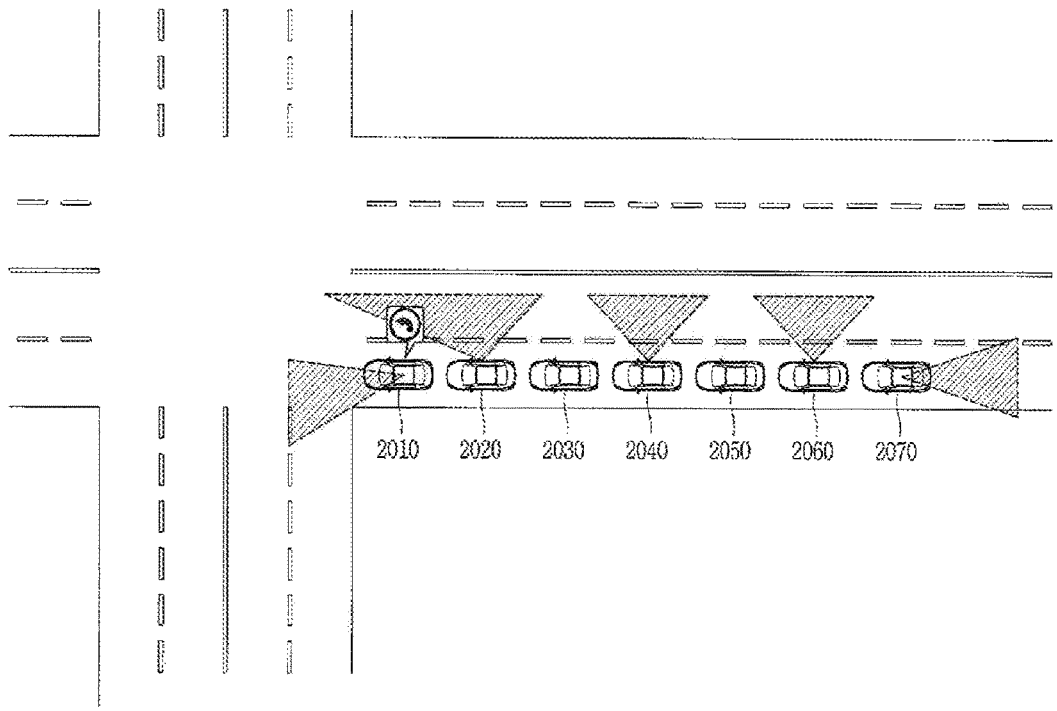
FIG. 20 is a conceptual diagram showing an embodiment in which sensing ranges of vehicles in platooning are reset in consideration of a driving direction.

FIG. 20 is a conceptual diagram showing an embodiment in which sensing ranges of vehicles in platooning are reset in consideration of a driving direction.

Referring to FIG. 20, when vehicles forming single-line platooning turn left, the sensing ranges may be changed.

As an embodiment, the sensing range of a front vehicle 2010 may be expanded from the front area to the front left area. Further, the sensing range of a second vehicle 2020 may also be expanded from the left area to the front right area. That is, the sensing ranges may be changed in consideration of the driving direction.

As another embodiment, the sensing ranges may be changed in accordance with the road shape. In detail, as in FIG. 20, when a single-line platooning group is in a first lane, a fourth vehicle 2040 and a sixth vehicle 2060 may sense only the right area and there is no need for sensing the left area.

Meanwhile, according to the embodiments described above, the control portion 820 can set the sensing range allocated to each of the at least one other vehicle not to overlap in the platooning.

As another embodiment, the control portion 820 may set a predetermined area to be included in a duplicate manner in the sensing range allocated to each of the at least one other vehicle.

In this case, the predetermined area may include an accident occurrence region, a traffic jam area, a crossroad area, etc. That is, when precise data is needed, the data can be set to be sensed by several sensors.

Figure 21:
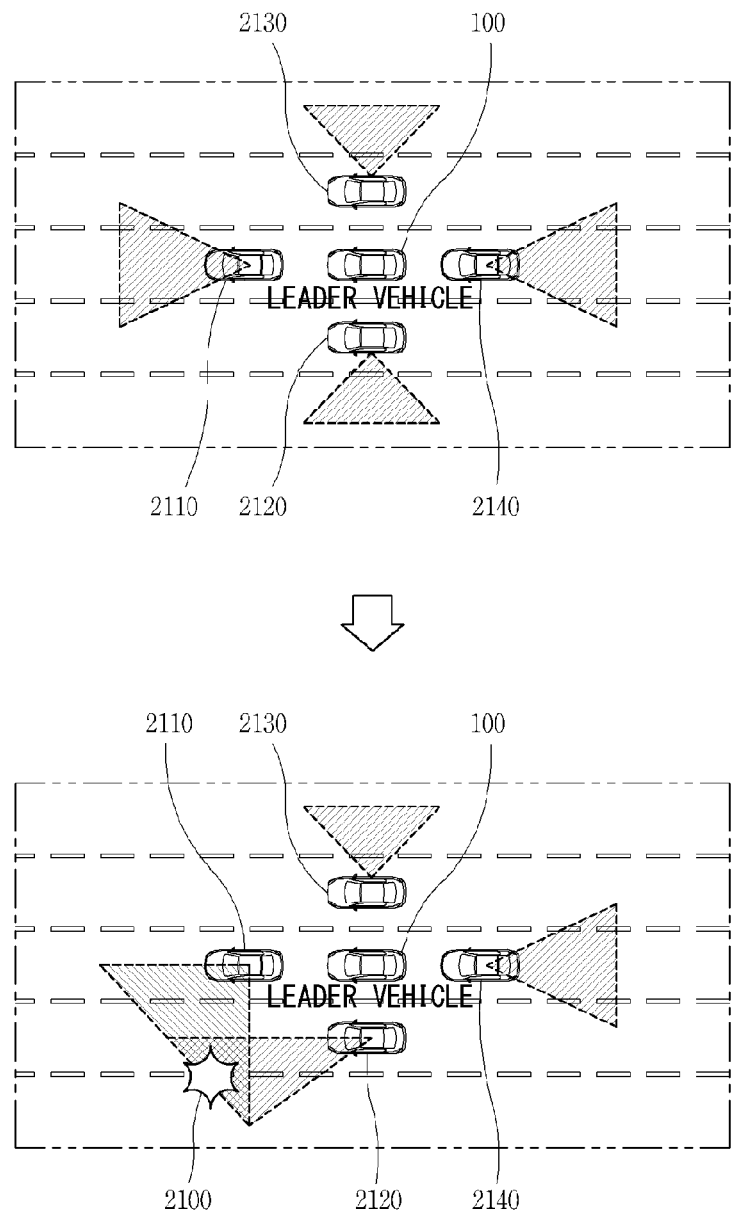
FIG. 21 is a conceptual view showing an embodiment in which sensing ranges are set in a duplicate manner.

FIG. 21 is a conceptual view showing an embodiment in which sensing ranges are set in a duplicate manner.

Referring to FIG. 21, following vehicles 2110, 2120, 2130, and 2140 may platoon while maintaining an arrangement surrounding a leader vehicle 100.

In this case, the sensing ranges of the following vehicles 2110, 2120, 2130, and 2140 may be set not to overlap.

As an embodiment, a first vehicle 2110 may be set to sense the front area, a second vehicle 2120 may be set to sense the left area, a third vehicle 2130 may be set to sense the right area, and a fourth vehicle 2140 may be set to sense the rear area. By setting sensing areas not to overlap in this way, it is possible to save communication resources.

As another embodiment, a predetermined area 2100 may be included in the sensing ranges of both of the first vehicle 2110 and the second vehicle 2120. In this case, the predetermined area 2100 may be an area that requires precise sensing such as an accident occurrence region, a traffic jam area, and a crossroad area.

The effects the vehicle control device mounted on a vehicle and a method for controlling the vehicle according to the present disclosure are as follows.

According to at least one of embodiments of the present disclosure, by allocating sensing ranges respectively to other vehicles forming platooning, there is no need for sensing the entire area. Accordingly, each of the following vehicles mainly senses a specific area, thereby being able to save communication resources.

Further, it is possible to select a vehicle having the most communication resources in reserve due to a small sensing range as a leader vehicle. As a result, the leader vehicle can transmit control information for platooning with a message using the saved resources.

That is, by allocating and sharing a sensing arrange for each vehicle, the communication resources of each vehicle can be saved and the data exchange speed can be improved.

The present disclosure can be achieved as computer-readable codes on a program-recoded medium. A computer-readable medium includes all kinds of recording devices that keep data that can be read by a computer system. For example, the computer-readable medium may be an HDD (Hard Disk Drive), an SSD (Solid State Disk), an SDD (Silicon Disk Drive), a ROM, a RAM, a CD-ROM, a magnetic tape, a floppy disk, and an optical data storage, and may also be implemented in a carrier wave type (for example, transmission using the internet). Further, the computer may include a processor or a control portion. Accordingly, the detailed description should not be construed as being limited in all respects and should be construed as an example. The scope of the present disclosure should be determined by reasonable analysis of the claims and all changes within an equivalent range of the present disclosure is included in the scope of the present disclosure.

The invention claimed is:

1. A vehicle control device for controlling a vehicle that is driven in a platoon with at least one other vehicle, the vehicle control device comprising:
   a communication interface configured to communicate with the at least one other vehicle; and
   a controller configured to, based on an arrangement pattern of the platoon, calculate at least one sensing range that is allocated to the at least one other vehicle included in the platoon,
   wherein the controller is further configured to:
      receive, from the at least one other vehicle, data sensed in the at least one sensing range,
      generate, based on the data sensed in the at least one sensing range, a control signal configured to control at least one of the vehicle or the at least one other vehicle in the platoon, cause a position of the at least one other vehicle in the platoon to change based on sensing performance for the at least one other vehicle, and generate a first control signal configured to position the vehicle as a leader vehicle in an area of the platoon, the vehicle having a smaller sensing range in the area of the platoon than the at least one sensing range allocated to the at least one other vehicle.

2. The vehicle control device of claim 1, wherein the controller is configured to, based on the platoon being reconstructed by at least one of the vehicle or the at least one other vehicle leaving the platoon or by a new vehicle joining the platoon, calculate the at least one sensing range in the reconstructed platoon.

3. The vehicle control device of claim 1, wherein the controller is configured to, based on the arrangement pattern of the platoon being changed, recalculate the at least one sensing range that is allocated to the at least one other vehicle.

4. The vehicle control device of claim 3, wherein the platoon includes a plurality of groups, one of the plurality of groups including the vehicle and one or more of the at least one other vehicle, and wherein the controller is configured to calculate one or more sensing ranges that are allocated to the one or more of the at least one other vehicle in the one of the plurality of groups.

5. The vehicle control device of claim 1, wherein the controller is configured to, based on a driving direction of the platoon, calculate the at least one sensing range that is allocated to the at least one other vehicle in the platoon.

6. The vehicle control device of claim 1, wherein the at least one other vehicle includes a plurality of other vehicles, and wherein the controller is configured to set sensing ranges that are allocated to the plurality of other vehicles such that at least two of the sensing ranges do not overlap in the platoon.

7. The vehicle control device of claim 1, wherein the at least one other vehicle includes a plurality of other vehicle, and wherein the controller is configured to set sensing ranges of the plurality of other vehicles such that at least two of the sensing ranges include a predetermined area in a duplicate manner.

8. The vehicle control device of claim 7, wherein the predetermined area is an accident prone area.

9. The vehicle control device of claim 7, wherein the predetermined area is a traffic jam area.

10. The vehicle control device of claim 7, wherein the predetermined area is a crossroad area.

11. A method for controlling a vehicle that performs platooning with at least one other vehicle, the method comprising:

communicating with the at least one other vehicle by:
receiving, from the at least one other vehicle, data sensed in the at least one sensing range, and
transmitting, to at least one of the vehicle or the at least one other vehicle, a control signal configured to control at least one of the vehicle or the at least one other vehicle in the platoon;

calculating at least one sensing range allocated to the at least one other vehicle based on an arrangement pattern of the platooning;

generating the control signal based on the data sensed in the at least one sensing range;

causing a position of the at least one other vehicle in the platoon to change based on sensing performance for the at least one other vehicle; and generating a first control signal configured to position the vehicle as a leader vehicle in an area of the platoon, the vehicle having a smaller sensing range in the area of the platoon than the at least one sensing range allocated to the at least one other vehicle.

* * * * *